(12) United States Patent
Tavakoli et al.

(10) Patent No.: US 11,574,296 B2
(45) Date of Patent: Feb. 7, 2023

(54) SYSTEMS AND METHODS FOR PROVIDING GRATUITIES TO MERCHANTS

(71) Applicant: BLOCK, INC., Oakland, CA (US)

(72) Inventors: Shahrouz Tavakoli, San Jose, CA (US); Nathan Spindel, San Francisco, CA (US); William Henderson, San Francisco, CA (US); Alan Fineberg, San Francisco, CA (US); Nefaur Khandker, San Francisco, CA (US); Christopher Clark, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/193,227

(22) Filed: Nov. 16, 2018

(65) Prior Publication Data

US 2019/0122201 A1 Apr. 25, 2019

Related U.S. Application Data

(63) Continuation of application No. 13/612,731, filed on Sep. 12, 2012, now abandoned.
(Continued)

(51) Int. Cl.
*G06Q 20/00* (2012.01)
*G06Q 20/32* (2012.01)

(52) U.S. Cl.
CPC ................................ *G06Q 20/3224* (2013.01)

(58) Field of Classification Search
USPC ........................................................ 705/39
See application file for complete search history.

(56) References Cited

U.S. PATENT DOCUMENTS

| 4,845,740 A | 7/1989 | Tokuyama et al. |
| 5,463,678 A | 10/1995 | Kepley, III et al. |

(Continued)

FOREIGN PATENT DOCUMENTS

| CA | 2 777 885 A1 | 5/2013 |
| DE | 20 2012 100 620 U1 | 8/2012 |

(Continued)

OTHER PUBLICATIONS

Tips on Tip Allocation Tarras, John. Restaurant Management; Cleveland vol. 2, Iss. 4, (Apr. 1988): 29. https://www.proquest.com/docview/215047345/9EC51816D5994EBAPQ/11?accountid=14753 (Year: 1988).*

(Continued)

*Primary Examiner* — Bruce I Ebersman
*Assistant Examiner* — Hatem M Ali
(74) *Attorney, Agent, or Firm* — Polsinelli PC

(57) ABSTRACT

A computer-implemented method for facilitating a merchant transaction comprises providing a list of one or more merchants that are in geographic proximity to a geolocation of a payer, and receiving a request from the payer to conduct a transaction with a merchant among the one or more merchants. The request can be received by a computer system programmed to facilitate the transaction. The transaction can then be processed with the aid of the computer system. A tip selection, which can include a tip amount, can be applied to the transaction. In some cases the tip selection is received from the payer as a selectable option. In other cases, the tip selection is automatically applied to the transaction without involvement from the payer during or upon the termination of the transaction.

16 Claims, 9 Drawing Sheets

Related U.S. Application Data

(60) Provisional application No. 61/684,624, filed on Aug. 17, 2012.

(56) References Cited

U.S. PATENT DOCUMENTS

| | | | |
|---|---|---|---|
| 5,729,591 A | 3/1998 | Bailey | |
| 5,751,373 A | 5/1998 | Ohyama et al. | |
| 5,760,773 A | 6/1998 | Berman et al. | |
| 5,764,742 A | 6/1998 | Howard et al. | |
| 5,850,599 A | 12/1998 | Seiderman | |
| 5,945,654 A | 8/1999 | Huang | |
| 6,026,375 A | 2/2000 | Hall et al. | |
| D424,036 S | 5/2000 | Arora et al. | |
| 6,076,079 A | 6/2000 | Boston et al. | |
| 6,129,277 A | 10/2000 | Grant et al. | |
| D437,858 S | 2/2001 | Yasui et al. | |
| 6,234,389 B1 | 5/2001 | Valliani et al. | |
| 6,262,724 B1 | 7/2001 | Crow et al. | |
| 6,308,227 B1 | 10/2001 | Kumar et al. | |
| 6,332,024 B1 | 12/2001 | Inoue et al. | |
| D454,356 S | 3/2002 | Hoxie et al. | |
| 6,481,623 B1 | 11/2002 | Grant et al. | |
| 6,497,368 B1 | 12/2002 | Friend et al. | |
| 6,505,046 B1 | 1/2003 | Baker | |
| 6,536,670 B1 | 3/2003 | Postman et al. | |
| 6,579,728 B2 | 6/2003 | Grant et al. | |
| 6,636,835 B2 | 10/2003 | Ragsdale-Elliott et al. | |
| 6,850,147 B2 | 2/2005 | Prokoski et al. | |
| 6,944,782 B2 | 9/2005 | von Mueller et al. | |
| 6,947,727 B1* | 9/2005 | Brynielsson | G06Q 20/425 455/414.1 |
| 7,003,316 B1 | 2/2006 | Elias et al. | |
| 7,004,382 B2 | 2/2006 | Sandru | |
| 7,149,296 B2 | 12/2006 | Brown et al. | |
| 7,163,148 B2 | 1/2007 | Durbin et al. | |
| 7,252,232 B2 | 8/2007 | Fernandes et al. | |
| 7,309,012 B2 | 12/2007 | von Mueller et al. | |
| D560,680 S | 1/2008 | Armendariz | |
| 7,324,836 B2 | 1/2008 | Steenstra et al. | |
| 7,343,317 B2 | 3/2008 | Jokinen et al. | |
| 7,343,565 B2 | 3/2008 | Ying et al. | |
| 7,363,054 B2 | 4/2008 | Elias et al. | |
| 7,409,234 B2 | 8/2008 | Glezerman | |
| 7,433,452 B2 | 10/2008 | Taylor et al. | |
| D582,939 S | 12/2008 | Neuhaus | |
| D593,580 S | 6/2009 | Truelove et al. | |
| 7,581,678 B2 | 9/2009 | Narendra et al. | |
| 7,708,189 B1 | 5/2010 | Cipriano | |
| D616,897 S | 6/2010 | Chaudhri et al. | |
| 7,810,729 B2 | 10/2010 | Morley | |
| 7,831,246 B1 | 11/2010 | Smith et al. | |
| 7,831,520 B2 | 11/2010 | Mengerink | |
| 7,848,765 B2 | 12/2010 | Phillips et al. | |
| 7,896,248 B2 | 3/2011 | Morley | |
| 7,918,394 B1 | 4/2011 | Morley, Jr. | |
| D650,794 S | 12/2011 | Pereira et al. | |
| 8,090,351 B2 | 1/2012 | Klein | |
| 8,121,945 B2 | 2/2012 | Rackley, III et al. | |
| 8,126,806 B1 | 2/2012 | DiMartino et al. | |
| 8,127,983 B1 | 3/2012 | Block et al. | |
| 8,135,624 B1 | 3/2012 | Ramalingam et al. | |
| 8,160,959 B2 | 4/2012 | Rackley, III et al. | |
| D669,090 S | 10/2012 | Rosen | |
| 8,281,998 B2 | 10/2012 | Tang et al. | |
| 8,396,808 B2 | 3/2013 | Greenspan | |
| D680,551 S | 4/2013 | Ishii et al. | |
| 8,459,546 B1 | 6/2013 | Block et al. | |
| 8,478,692 B2 | 7/2013 | Carlson et al. | |
| 8,485,440 B1 | 7/2013 | Arora et al. | |
| 8,489,112 B2 | 7/2013 | Roeding et al. | |
| 8,510,220 B2 | 8/2013 | Rackley, III et al. | |
| 8,635,157 B2 | 1/2014 | Smith et al. | |
| 8,639,629 B1 | 1/2014 | Hoffman | |
| 8,654,222 B2 | 2/2014 | Kuwazoe | |
| 8,655,782 B2 | 2/2014 | Poon et al. | |
| 8,659,427 B2 | 2/2014 | Brown et al. | |
| 8,660,965 B1 | 2/2014 | Bickerstaff | |
| D702,717 S | 4/2014 | Abratowski et al. | |
| 8,700,527 B2 | 4/2014 | Dolphin et al. | |
| D705,805 S | 5/2014 | Schweizer | |
| D705,807 S | 5/2014 | Tursi | |
| D706,796 S | 6/2014 | Talbot | |
| D707,704 S | 6/2014 | Capua et al. | |
| 8,751,380 B2 | 6/2014 | Harvey et al. | |
| D710,866 S | 8/2014 | Safa | |
| D714,332 S | 9/2014 | Jung et al. | |
| D714,822 S | 10/2014 | Capua et al. | |
| D717,328 S | 11/2014 | Lin | |
| 8,886,569 B2 | 11/2014 | Patel et al. | |
| 8,972,297 B2 | 3/2015 | Kay et al. | |
| D732,059 S | 6/2015 | Andersen et al. | |
| 9,107,064 B1 | 8/2015 | Ramalingam et al. | |
| 9,436,955 B2 | 9/2016 | Dorsey et al. | |
| 9,576,289 B2 | 2/2017 | Henderson et al. | |
| 9,589,269 B2 | 3/2017 | Henderson et al. | |
| 9,633,352 B2 | 4/2017 | Henderson et al. | |
| 9,799,034 B1 | 10/2017 | Varma et al. | |
| 9,830,606 B2 | 11/2017 | Boncimino | |
| 9,959,529 B1 | 5/2018 | Varma et al. | |
| 10,026,083 B1 | 7/2018 | Varma et al. | |
| 10,068,272 B1 | 9/2018 | Varma et al. | |
| 2002/0095380 A1* | 7/2002 | Singhal | G06Q 20/204 705/40 |
| 2002/0181710 A1 | 12/2002 | Adam et al. | |
| 2003/0037001 A1 | 2/2003 | Richardson | |
| 2004/0012875 A1 | 1/2004 | Wood | |
| 2004/0041911 A1 | 3/2004 | Odagiri et al. | |
| 2004/0058705 A1 | 3/2004 | Morgan et al. | |
| 2005/0236480 A1 | 10/2005 | Vrotsos et al. | |
| 2005/0247787 A1 | 11/2005 | Von Mueller et al. | |
| 2005/0271199 A1 | 12/2005 | Collins, Jr. | |
| 2006/0138219 A1 | 6/2006 | Brzezniak et al. | |
| 2006/0148520 A1 | 7/2006 | Baker et al. | |
| 2006/0270421 A1 | 11/2006 | Phillips et al. | |
| 2006/0273158 A1 | 12/2006 | Suzuki | |
| 2006/0273163 A1 | 12/2006 | Gusler et al. | |
| 2007/0214237 A1 | 9/2007 | Stibel et al. | |
| 2008/0040146 A1 | 2/2008 | Rogovin | |
| 2008/0172733 A1 | 7/2008 | Coriaty et al. | |
| 2008/0208762 A1 | 8/2008 | Arthur et al. | |
| 2009/0144161 A1 | 6/2009 | Fisher | |
| 2009/0158212 A1 | 6/2009 | Dykstra-Erickson et al. | |
| 2009/0177581 A1 | 7/2009 | Garcia et al. | |
| 2009/0187492 A1 | 7/2009 | Hammad et al. | |
| 2009/0313165 A1 | 12/2009 | Walter | |
| 2010/0010906 A1 | 1/2010 | Grecia | |
| 2010/0063889 A1 | 3/2010 | Proctor, Jr. et al. | |
| 2010/0070378 A1 | 3/2010 | Trotman et al. | |
| 2010/0076853 A1 | 3/2010 | Schwarz | |
| 2010/0108762 A1 | 5/2010 | Morley | |
| 2010/0121726 A1 | 5/2010 | Coulter et al. | |
| 2010/0125495 A1* | 5/2010 | Smith | G06Q 40/02 705/14.23 |
| 2010/0174596 A1 | 7/2010 | Gilman et al. | |
| 2010/0182341 A1 | 7/2010 | Lee et al. | |
| 2010/0208876 A1 | 8/2010 | Tsuei | |
| 2010/0216396 A1 | 8/2010 | Fernandez et al. | |
| 2010/0217675 A1 | 8/2010 | Bookstaff | |
| 2010/0217699 A1 | 8/2010 | Bookstaff | |
| 2010/0222000 A1 | 9/2010 | Sauer et al. | |
| 2010/0250410 A1 | 9/2010 | Song et al. | |
| 2010/0325048 A1 | 12/2010 | Carlson et al. | |
| 2011/0022472 A1 | 1/2011 | Zon | |
| 2011/0040624 A1 | 2/2011 | Jhanji | |
| 2011/0076992 A1 | 3/2011 | Chou et al. | |
| 2011/0113360 A1 | 5/2011 | Johnson et al. | |
| 2011/0172004 A1 | 7/2011 | Breitenbach et al. | |
| 2011/0173041 A1 | 7/2011 | Breitenbach et al. | |
| 2011/0173092 A1 | 7/2011 | Werbitt | |
| 2011/0174879 A1 | 7/2011 | Morley | |
| 2011/0184837 A1 | 7/2011 | Biro | |
| 2011/0202463 A1 | 8/2011 | Powell | |
| 2011/0238514 A1 | 9/2011 | Ramalingam et al. | |

(56) References Cited

U.S. PATENT DOCUMENTS

| | | |
|---|---|---|
| 2011/0251910 A1 | 10/2011 | Dimmick |
| 2011/0259957 A1 | 10/2011 | Tsai |
| 2011/0276419 A1 | 11/2011 | Johnson et al. |
| 2012/0005039 A1 | 1/2012 | Dorsey et al. |
| 2012/0016794 A1 | 1/2012 | Orr et al. |
| 2012/0061467 A1 | 3/2012 | Tang et al. |
| 2012/0062599 A1 | 3/2012 | Machida |
| 2012/0072350 A1 | 3/2012 | Goldthwaite et al. |
| 2012/0084177 A1 | 4/2012 | Tanaka et al. |
| 2012/0095906 A1 | 4/2012 | Dorsey et al. |
| 2012/0144329 A1 | 6/2012 | Sasaki |
| 2012/0209657 A1 | 8/2012 | Connolly |
| 2012/0284671 A1 | 11/2012 | Bamford et al. |
| 2012/0290421 A1 | 11/2012 | Qawami et al. |
| 2012/0290422 A1 | 11/2012 | Bhinder |
| 2012/0310744 A1 | 12/2012 | Kim et al. |
| 2012/0310824 A1 | 12/2012 | Liberty |
| 2012/0330769 A1 | 12/2012 | Arceo |
| 2013/0020389 A1 | 1/2013 | Barnett |
| 2013/0036051 A1 | 2/2013 | Giordano et al. |
| 2013/0050250 A1 | 2/2013 | Brinda et al. |
| 2013/0059598 A1 | 3/2013 | Miyagi et al. |
| 2013/0110658 A1 | 5/2013 | Lyman et al. |
| 2013/0111412 A1 | 5/2013 | Sura et al. |
| 2013/0124413 A1* | 5/2013 | Itwaru .............. G06Q 20/20 705/44 |
| 2013/0132274 A1 | 5/2013 | Henderson et al. |
| 2013/0151419 A1 | 6/2013 | Hitchcock et al. |
| 2013/0159119 A1 | 6/2013 | Henderson et al. |
| 2013/0212017 A1 | 8/2013 | Bangia |
| 2013/0238436 A1 | 9/2013 | Light et al. |
| 2013/0248596 A1 | 9/2013 | Arora et al. |
| 2013/0262306 A1 | 10/2013 | Ladha |
| 2014/0012689 A1 | 1/2014 | Henderson et al. |
| 2014/0012757 A1 | 1/2014 | Henderson et al. |
| 2014/0015785 A1 | 1/2014 | Sato et al. |
| 2014/0052613 A1 | 2/2014 | Tavakoli et al. |
| 2014/0052615 A1 | 2/2014 | Andersen |
| 2014/0074743 A1 | 3/2014 | Rademaker |
| 2014/0108173 A1 | 4/2014 | Cooper et al. |
| 2014/0123072 A1 | 5/2014 | Bhowmick et al. |
| 2014/0129356 A1 | 5/2014 | Jain et al. |
| 2014/0143145 A1 | 5/2014 | Kortina et al. |
| 2014/0156531 A1 | 6/2014 | Poon et al. |
| 2014/0257877 A1 | 9/2014 | L'Heureux et al. |
| 2014/0258132 A1 | 9/2014 | Swamy et al. |
| 2014/0263630 A1 | 9/2014 | Richardson et al. |
| 2014/0278609 A1 | 9/2014 | Capps |
| 2014/0279185 A1 | 9/2014 | Merz et al. |
| 2014/0310182 A1 | 10/2014 | Cummins |
| 2014/0379582 A1 | 12/2014 | Caglayan et al. |
| 2015/0019431 A1 | 1/2015 | Strasding et al. |
| 2015/0031393 A1 | 1/2015 | Post et al. |
| 2015/0046339 A1 | 2/2015 | Wong et al. |
| 2015/0081532 A1 | 3/2015 | Lewis et al. |
| 2015/0100488 A1 | 4/2015 | Dua |
| 2015/0339648 A1 | 11/2015 | Kushevsky et al. |
| 2015/0347999 A1 | 12/2015 | Lau et al. |
| 2016/0232515 A1 | 8/2016 | Jhas et al. |
| 2017/0124567 A1 | 5/2017 | Henderson et al. |

FOREIGN PATENT DOCUMENTS

| | | | |
|---|---|---|---|
| JP | 2003-108777 A | 4/2003 | |
| JP | 2006-139641 A | 6/2006 | |
| JP | 2006-179060 A | 7/2006 | |
| JP | 2006-308438 A | 11/2006 | |
| WO | 02/084548 A1 | 10/2002 | |
| WO | 2011014875 A1 | 2/2011 | |
| WO | WO-2015069389 A1 * | 5/2015 | ............. G06Q 20/00 |

OTHER PUBLICATIONS

Restaurant Owners Claim Tip Tax Is Putting Bite on Profits Meitrodt, Jeffrey. New Orleans City Business; Metairie vol. 9, Iss. 1, (Jul. 4, 1988): 7. https://www.proquest.com/docview/209551585/ 9EC51816D5994EBAPQ/13?accountid=14753 (Year: 1988).*

Your Money: Restaurants Try Alternative to Tipping Vander Schaaf, Rachelle.Sylvia Porter's Personal Finance; New York vol. 6, Iss. 7, (Sep. 1988): 12. https://www.proquest.com/docview/200298363/ 9EC51816D5994EBAPQ/15?accountid=14753 (Year: 1988).*

Thesis: Mobile writing technologies and the dislocation of the computer classroom: Zoetewey, Meredith Weisberg. Purdue University. ProQuest Dissertations Publishing, 2005. 3210827. (Year: 2005).*

Scholarly Journal: Clicking with dollars: How consumers can pay for purchases from E-tailers Schreft, Stacey L. Economic Review— Federal Reserve Bank of Kansas City; Kansas City vol. 87, Iss. 1, (First Quarter 2002): 37-64. (Year: 2002).*

Thesis: Mobile writing technologies and the dislocation of the computer classroom: Zoetewey, Meredith Weisberg. Purdue University. ProQuest Dissertations Publishing, 2005. 3210827. (Year: 2005) (Year: 2005).*

Scholarly Journal: Clicking with dollars: How consumers can pay for purchases from E-tailers Schreft, Stacey L. Economic Review— Federal Reserve Bank of Kansas City; Kansas City vol. 87, Iss. 1, (First Quarter 2002): 37-64. (Year: 2002) (Year: 2002).*

Non-Final Office Action dated Jan. 7, 2015, for U.S. Appl. No. 14/017,940, of Henderson, W., et al., filed Sep. 4, 2013.

Non-Final Office Action dated Jan. 9, 2015, for U.S. Appl. No. 14/498,975, of Varma, A.K., et al., filed Sep. 26, 2014.

Notice of Allowance dated Jan. 30, 2015, for U.S. Appl. No. 29/429,897, Andersen, R., et al., filed Aug. 17, 2012.

Non-Final Office Action dated Mar. 4, 2015, for U.S. Appl. No. 13/088,032, of Dorsey, J., et al., filed Apr. 15, 2011.

Non-Final Office Action dated Mar. 17, 2015, for U.S. Appl. No. 13/683,879, of Henderson, W., et al., filed Nov. 21, 2012.

Final Office Action dated Jul. 8, 2015, for U.S. Appl. No. 14/498,975, of Varma, A.K., et al., filed Sep. 26, 2014.

Non-Final Office Action dated Aug. 7, 2015, for U.S. Appl. No. 14/066,459, of Perito, D., et al., filed Oct. 29, 2013.

Non-Final Office Action dated Aug. 26, 2015, for U.S. Appl. No. 14/017,247, of Henderson, W., et al., filed Sep. 3, 2013.

Non-Final Office Action dated Aug. 27, 2015, for U.S. Appl. No. 14/017,940, of Henderson, W., et al., filed Sep. 4, 2013.

Non-Final Office Action dated Aug. 28, 2015, for U.S. Appl. No. 13/612,731, of Tavakoli, S., et al., filed Sep. 12, 2012.

Final Office Action dated Nov. 5, 2015, for U.S. Appl. No. 13/683,879, of Henderson, W., et al., filed Nov. 21, 2012.

Final Office Action dated Nov. 20, 2015, for U.S. Appl. No. 13/088,032, of Dorsey, J., et al., filed Apr. 15, 2011.

Final Office Action dated Jan. 21, 2016, for U.S. Appl. No. 14/066,459, of Perito, D., et al., filed Oct. 29, 2013.

Final Office Action dated Feb. 12, 2016, for U.S. Appl. No. 14/017,940, of Henderson, W., et al., filed Sep. 4, 2013.

Non-Final Office Action dated Mar. 29, 2016, for U.S. Appl. No. 14/066,459, of Perito, D., et al., filed Oct. 29, 2013.

Ex parte Quayle Action mailed Apr. 8, 2016, for U.S. Appl. No. 13/088,032, of Dorsey, J., et al., filed Apr. 15, 2011.

Non-Final Office Action dated Apr. 22, 2016, for U.S. Appl. No. 13/683,879, of Henderson, W., et al., filed Nov. 21, 2012.

Non-Final Office Action dated Apr. 22, 2016, for U.S. Appl. No. 14/498,975, of Varma, A.K., et al., filed Sep. 26, 2014.

Non-Final Office Action dated Apr. 22, 2016, for U.S. Appl. No. 13/683,841, of Henderson, W., et al., filed Nov. 21, 2012.

Final Office Action dated Apr. 27, 2016, for U.S. Appl. No. 14/017,247, of Henderson, W., et al., filed Sep. 3, 2013.

Notice of Allowance dated Jun. 16, 2016, for U.S. Appl. No. 13/088,032, of Dorsey, J., et al., filed Apr. 15, 2011.

Advisory Action dated Aug. 5, 2016, for U.S. Appl. No. 14/017,247, of Henderson, W., et al., filed Sep. 3, 2013.

Notice of Allowance dated Oct. 7, 2016, for U.S. Appl. No. 14/017,940, of Henderson, W., et al., filed Sep. 4, 2013.

(56) References Cited

OTHER PUBLICATIONS

Notice of Allowance dated Oct. 24, 2016, for U.S. Appl. No. 13/683,879, of Henderson, W., et al., filed Nov. 21, 2012.
Final Office Action dated Oct. 26, 2016, for U.S. Appl. No. 14/066,459, of Perito, D., et al., filed Oct. 29, 2013.
Final Office Action dated Oct. 31, 2016, for U.S. Appl. No. 14/498,975, of Varma, A.K., et al., filed Sep. 26, 2014.
Final Office Action dated Nov. 3, 2016, for U.S. Appl. No. 13/683,841, of Henderson, W., et al., filed Nov. 21, 2012.
Notice of Allowance dated Nov. 30, 2016, for U.S. Appl. No. 14/017,940, of Henderson, W., et al., filed Sep. 4, 2013.
Notice of Allowance dated Dec. 27, 2016, for U.S. Appl. No. 14/017,247, of Henderson, W., et al., filed Sep. 3, 2013.
Advisory Action dated Feb. 6, 2017, for U.S. Appl. No. 14/066,459, of Perito, D., et al., filed Oct. 29, 2013.
Advisory Action dated Feb. 23, 2017, for U.S. Appl. No. 13/683,841, of Henderson, W., et al., filed Nov. 21, 2012.
Final Office Action dated Mar. 3, 2017, for U.S. Appl. No. 13/612,731, of Tavakoli, S., et al., filed Sep. 12, 2012.
Examiner's Requisition for Canadian Patent Application No. 2,777,885, dated Apr. 5, 2017.
Non-Final Office Action dated May 1, 2017, for U.S. Appl. No. 14/498,922, of Varma, A.K., et al., filed Sep. 26, 2014.
Notice of Allowance dated Jun. 20, 2017, for U.S. Appl. No. 14/498,975, of Varma, A.K., et al., filed Sep. 26, 2014.
Non-Final Office Action dated Jul. 10, 2017, for U.S. Appl. No. 14/498,876, of Varma, A.K., et al., filed Sep. 26, 2014.
Non-Final Office Action dated Jul. 13, 2017, for U.S. Appl. No. 14/498,912, of Varma, A.K., et al., filed Sep. 26, 2014.
Advisory Action dated Jul. 13, 2017, for U.S. Appl. No. 13/612,731, of Tavakoli, S., et al., filed Sep. 12, 2012.
Non-Final Office Action dated Aug. 8, 2017, for U.S. Appl. No. 14/066,459, of Perito, D., et al., filed Oct. 29, 2013.
Non-Final Office Action dated Aug. 11, 2017, for U.S. Appl. No. 13/683,841, of Henderson, W., et al., filed Nov. 21, 2012.
Final Office Action dated Aug. 16, 2017, for U.S. Appl. No. 14/498,922, of Varma, A.K., et al., filed Sep. 26, 2014.
Final Office Action dated Nov. 17, 2017, for U.S. Appl. No. 14/066,459, of Perito, D., et al., filed Oct. 29, 2013.
Final Office Action dated Nov. 22, 2017, for U.S. Appl. No. 14/498,912, of Varma, A.K., et al., filed Sep. 26, 2014.
Notice of Allowance dated Dec. 11, 2017, for U.S. Appl. No. 14/498,876, of Varma, A.K., et al., filed Sep. 26, 2014.
Non-Final Office Action dated Dec. 15, 2017, for U.S. Appl. No. 14/498,922, of Varma, A.K., et al., filed Sep. 26, 2014.
Non-Final Office Action dated Jan. 19, 2018, for U.S. Appl. No. 13/612,731, of Tavakoli, S., et al., filed Sep. 12, 2012.
Advisory Action dated Jan. 30, 2018, for U.S. Appl. No. 14/498,912, of Varma, A.K., et al., filed Sep. 26, 2014.
Examiner's Requisition for Canadian Patent Application No. 2,777,885, dated Mar. 9, 2018.
Final Office Action dated Apr. 2, 2018, for U.S. Appl. No. 13/683,841, of Henderson, W., et al., filed Nov. 21, 2012.
Notice of Allowance dated Apr. 5, 2018, for U.S. Appl. No. 14/498,912, of Varma, A.K., et al., filed Sep. 26, 2014.
Barnes, "Location-Based Services," Victoria University of Wellington, 2003, 14 pages.
Rustamov, "Payments papers, Directions in the development of the payment service market," Central Bank of the Republic of Azerbaijamn, Payment Systems and Settlements Department, AZ1014, 32, R. Behbudov str., Baku Azerbaijan, 2016, 14 pages.
Notice of Allowance dated Nov. 7, 2019, for U.S. Appl. No. 15/408,300, of Henderson, W., et al., filed Jan. 17, 2017.
Notice of Allowance for Canadian Patent Application No. 2,777,885, dated Feb. 19, 2019.
Ex Parte Quayle Action mailed Jun. 17, 2019, for U.S. Appl. No. 15/408,300, of Henderson, W., et al., filed Jan. 17, 2017.
Non-Final Office Action dated Sep. 16, 2019, for U.S. Appl. No. 15/923,682, of Perito, D., et al., filed Mar. 16, 2018.

"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-SID . . . , on Apr. 19, 2011, pp. 1-2.
"Arduino magnetic stripe decoder," Instructables, Retrieved from the Internet URL: http://www.instructables.com/id/Arduino-magneticstripe-decorder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Bluetooth Low Energy," Wikipedia, Retrieved from the Internet URL: http://en.wikipedia.org/wiki/Bluetooth_low_energy, on Nov. 11, 2014, pp. 1-9.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Headphone Jack (3.5mm)," Retrieved from the Internet URL: http://www.phonescoop.com/glossary/term.php?gid=440, on May 5, 2011, pp. 1-1.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modem," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.

(56) References Cited

OTHER PUBLICATIONS

"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," dated Nov. 10, 2014, Retrieved from the internet URL: https://play.google.com/store/apps/details?id=com.ubercab&hl=en, on Nov. 12, 2014, pp. 2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Adractas, M., et al., "The road to mobile payments services," McKinsey on Payments, pp. 45-52 (Sep. 2011).
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
"Justin, ""Visa Enters the Location-Based Mobile Marketing Space With New iPhone App,"" dated Dec. 14, 2010, Retrieved from the internet URL: http://www.mobilemarketingwatch.com/visa-enters-the-location-based-mobile-marketing-space-with-new-iphone-app-11875/, on Feb. 23, 2015, p. 1".
Kuo, Y-S et al., "Hijacking Power and Bandwidth from the Mobile Phone's Audio Interface," Proceedings of the First ACM Symposium on Computing for Development, (DEV10), Dec. 17, 2010, pp. 1-10.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Non-Final Office Action dated Jun. 22, 2012, for U.S. Appl. No. 13/088,032, of Dorsey, J., et al., filed Apr. 15, 2011.
Final Office Action dated Nov. 23, 2012, for U.S. Appl. No. 13/088,032, of Dorsey, J., et al., filed Apr. 15, 2011.
Non-Final Office Action dated Oct. 7, 2013, for U.S. Appl. No. 13/179,836, of Dorsey, J., et al., filed Jul. 11, 2011.
Non-Final Office Action dated Oct. 25, 2013, for U.S. Appl. No. 13/683,841, of Henderson, W., et al., filed Nov. 21, 2012.
Non-Final Office Action dated Jan. 30, 2014, for U.S. Appl. No. 13/612,731, of Tavakoli, S., et al., filed Sep. 12, 2012.
Non-Final Office Action dated May 29, 2014, for U.S. Appl. No. 14/017,247, of Henderson, W., et al., filed Sep. 3, 2013.
Non-Final Office Action dated Jun. 19, 2014, for U.S. Appl. No. 13/088,032, of Dorsey, J., et al., filed Apr. 15, 2011.
Non-Final Office Action dated Jul. 24, 2014, for Design U.S. Appl. No. 29/429,897, Andersen, R. et al., filed Aug. 17, 2012.
Final Office Action dated Nov. 5, 2014, for U.S. Appl. No. 13/612,731, of Tavakoli, S., et al., filed Sep. 12, 2012.
Notice of Allowance dated Apr. 27, 2018, for U.S. Appl. No. 14/498,922, of Varma, A.K., et al., filed Sep. 26, 2014.
Notice of Allowance dated Aug. 8, 2018, for U.S. Appl. No. 14/498,922, of Varma, A.K., et al., filed Sep. 26, 2014.
Final Office Action dated Aug. 16, 2018, for U.S. Appl. No. 13/612,731, of Tavakoli, S., et al., filed Sep. 12, 2012.
Notice of Allowance dated Sep. 7, 2018, for U.S. Appl. No. 13/683,841, of Henderson, W., et al., filed Nov. 21, 2012.
Corrected Notice of Allowance dated Oct. 3, 2018, for U.S. Appl. No. 13/683,841, of Henderson, W., et al., filed Nov. 21, 2012.
Non-Final Office Action dated Nov. 16, 2018, for U.S. Appl. No. 15/408,300, of Henderson, W., et al., filed Jan. 17, 2017.
Final Office Action dated Feb. 10, 2020 , for U.S. Appl. No. 15/923,682, of Perito, D., et al., filed Mar. 16, 2018.
Non-Final Office Action dated Aug. 17, 2020, for U.S. Appl. No. 15/923,682, of Perito, D., et al., filed Mar. 16, 2018.
Advisory Action dated May 19, 2020, for U.S. Appl. No. 15/923,682, of Perito, D., et al., filed Mar. 16, 2018.
Final Office Action dated Dec. 8, 2020, for U.S. Appl. No. 15/923,682, of Perito, D., et al., filed Mar. 16, 2018.

\* cited by examiner

SYSTEMS AND METHODS FOR PROVIDING GRATUITIES TO MERCHANTS

CROSS-REFERENCE

This application claims priority to and is a continuation of U.S. patent application Ser. No. 13/612,731, filed on Sep. 12, 2012 which claims the benefit under 35 U.S.C. § 119(e) of the filing date of U.S. Provisional Patent Application No. 61/684,624, filed on Aug. 17, 2012, entitled "SYSTEMS AND METHODS FOR PROVIDING GRATUITIES TO MERCHANTS," the entirety of which is herein incorporated by reference.

BACKGROUND

Consumers routinely make purchases using plastic credit or debit cards. Such plastic cards typically have magnetic stripes or chips that are encoded with information, such as a consumer's account information. A credit or a debit card may be used in a business transaction with a bank or creditor through use of a device that communicates with the bank or creditor, such as, for example an automated teller machine (ATM) or a credit card reader.

Credit cards having standard specifications can typically be read by point-of-sale devices at the location of a merchant. When the card is coupled to an electronic card reader at the merchant, such as a platform card reader, the electronic card reader may use its built-in communications interface to contact a creditor that handles credit authentication requests to process the transaction. The transaction may be finalized upon verification of the consumer's account information and the receipt of an approval signal from the creditor.

Despite the prevalence of systems and methods that implement point of sale transactions using plastic cards, plastic cards may prove problematic in situations in which a merchant does not accept payment using a plastic card or a communications link from the merchant to the creditor is inoperable.

SUMMARY

The disclosure provides systems and methods for enabling payers to provide gratuities (or tips) to merchants. In some cases, a system for facilitating payer-merchant transactions automatically tips a merchant upon the completion of a transaction between a merchant and a payer. In other cases, prior to completing the transaction between the merchant and the payer, the system provides the payer the opportunity to elect to tip the merchant. In some examples, the system permits the payer to select a tip amount.

An aspect of the disclosure provides a computer-implemented method for facilitating a merchant transaction, comprising providing a list of one or more merchants that are in proximity to a geolocation of a payer, and receiving a request from the payer to conduct a transaction with a merchant among the one or more merchants. The request can be received by a computer system programmed to facilitate the transaction. Next, a tip selection to apply to the transaction can be received from the payer. The transaction can then be processed with the aid of a processor of the computer system. The tip selection can be applied to the transaction during or upon the termination of the transaction. In an embodiment, the method further comprises providing the payer a tip option. In another embodiment, the tip selection comprises a tip amount to apply to the transaction. In another embodiment, the tip selection is selected by the payer from one or more tip options provided to the payer. In another embodiment, the one or more tip options are provided to the payer by the computer system. In another embodiment, the list is provided on a graphical user interface of an electronic device of the payer. In another embodiment, the request is received from an electronic device of the payer. In another embodiment, the electronic device is a portable electronic device. In another embodiment, before providing the list of one or more merchants, the geolocation of the payer is determined with the aid of a geolocation device of the payer. In another embodiment, the request is received from the geolocation device. In another embodiment, the payer receives a receipt upon the completion of the transaction between the payer and the merchant. In another embodiment, between receiving a request from the payer to conduct a transaction and receiving a tip selection, the computer system informs the merchant that the payer has requested to conduct a transaction with the merchant. In another embodiment, the payer is permitted to request to conduct the transaction if the payer is at or in proximity to the merchant. In another embodiment, upon receiving the request from the payer to conduct a transaction, the computer system initiates the transaction between the payer and the merchant. In another embodiment, the computer system initiates the transaction if the payer is at or in proximity to the merchant. In another embodiment, the one or more merchants are within a given distance from the geolocation of the payer. In another embodiment, the list of one or more merchants is provided on a graphical user interface of an electronic device of the payer.

In another aspect of the disclosure, a computer-implemented method for facilitating a merchant transaction comprises providing a list of one or more merchants that are in proximity to a geolocation of a payer. A request from the payer can be received to conduct a transaction with a merchant among the one or more merchants. The request can be received by a computer system programmed to facilitate the transaction. The transaction can be processed with the aid of a processor of the computer system. A tip selection can be automatically applied to the transaction without involvement from the payer during or upon the termination of the transaction. The tip selection can be applied if the payer has provided the computer system an indication to automatically apply the tip selection. In an embodiment, the tip selection comprises a tip amount that is automatically applied to the transaction. In another embodiment, the list is provided on a graphical user interface of an electronic device of the payer. In another embodiment, the request is received from an electronic device of the payer. In another embodiment, the electronic device is a portable electronic device. In another embodiment, prior to providing a list of one or more merchants, the geolocation of the payer is determined with the aid of a geolocation device of the payer. In another embodiment, the request to conduct a transaction is received from the geolocation device. In another embodiment, the method further comprises providing the payer a receipt upon the completion of the transaction between the payer and the merchant. In another embodiment, between receiving a request from the payer to conduct the transaction and processing the transaction, the computer system informs the merchant that the payer has requested to conduct a transaction with the merchant. In another embodiment, the payer is permitted to request to conduct the transaction if the payer is at or in proximity to the merchant. In another embodiment, upon receiving the request from the payer to conduct the transaction, the computer system initiates the transaction between the payer and the merchant. In another embodiment, the computer system initiates the transaction if the payer is at or in proximity to the merchant. In another embodiment, the tip amount is specific to the merchant. In another embodiment, the method further comprises receiving from the payer an indication that the tip selection is to be automatically applied to the transaction. In another embodiment, the one or more merchants are within a given distance from the geolocation of the payer. In another embodiment, the list of one or more merchants is provided on a graphical user interface of an electronic device of the payer.

Another aspect of the disclosure provides a computer-implemented method for facilitating a transaction between a merchant and a payer, comprising providing, in a merchant card displayed on a graphical user interface (GUI) of an electronic device of the payer, information of or related to the merchant with which the payer has requested to conduct a transaction. The merchant card can include one or more input fields, each of which can be for permitting the payer to provide a tip selection to be applied to the transaction. Next, with the aid of the GUI, a tip selection from the payer can be received. The tip selection can be provided by the payer in a given input field of the one or more input fields. The transaction can then be processed between the payer and the merchant. The tip amount can be applied to the transaction. In an embodiment, the tip selection includes a tip amount to apply to the transaction. In another embodiment, the merchant is at or in proximity to a geolocation of the payer. In another embodiment, the geolocation is determined with the aid of an electronic device of the payer. In another embodiment, the method further comprises providing the payer a receipt upon the completion of the transaction between the payer and the merchant. In another embodiment, the one or more input fields include selectable elements. In another embodiment, the selectable elements are predetermined tip amounts. In another embodiment, the predetermined tip amounts are specific to the merchant.

Another aspect of the disclosure provides a computer readable medium comprising code that, upon execution by one or more processors, implements a method, the method comprising providing a list of one or more merchants that are in proximity to a geolocation of a payer, and receiving a request from the payer to conduct a transaction with a merchant among the one or more merchants. The request can be received by a computer system programmed to facilitate the transaction. Next, from the payer, a tip selection is received to apply to the transaction. The transaction can be processed with the aid of a processor of the computer system. The tip selection can be applied to the transaction during or upon the termination of the transaction.

Another aspect of the disclosure provides a computer readable medium comprising code that, upon execution by one or more processors, implements a method, the method comprising providing a list of one or more merchants that are in proximity to a geolocation of a payer, and receiving a request from the payer to conduct a transaction with a merchant among the one or more merchants. The request can be received by a computer system programmed to facilitate the transaction. Next, the transaction is processed with the aid of a processor of the computer system. A tip selection can be automatically applied to the transaction without involvement from the payer during or upon the termination of the transaction.

Another aspect of the disclosure provides a computer readable medium comprising code that, upon execution by one or more processors, implements a method, the method comprising providing, in a merchant card displayed on a graphical user interface (GUI) of an electronic device of the payer, information of or related to the merchant with which the payer has requested to conduct a transaction. The merchant card can include one or more input fields, each of which one or more input fields can be for permitting the payer to provide a tip selection to be applied to the transaction. Next, with the aid of the GUI, a tip selection can be received from the payer. The tip selection can be provided by the payer in a given input field of the one or more input fields. With the aid of a processor, the transaction between the payer and the merchant can be processed. The tip amount can be applied to the transaction.

Another aspect of the disclosure provides a system for facilitating a merchant transaction, comprising one or more computer processors and a memory location coupled to the one or more computer processors. The memory location comprises code that, upon execution by the one or more computer processors, implements a method, the method comprising: (i) providing a list of one or more merchants that are in proximity to a geolocation of a payer; (ii) receiving a request from the payer to conduct a transaction with a merchant among the one or more merchants, wherein the request is received by a computer system programmed to facilitate the transaction; (iii) receiving, from the payer, a tip selection to apply to the transaction; and (iv) processing the transaction with the aid of a computer processor of the computer system, wherein the tip selection is applied to the transaction during or upon the termination of the transaction. In an embodiment, the system is adapted (e.g., programmed) to provide the list of (i) on a graphical user interface of an electronic device of the payer. In another embodiment, the system is adapted to receive the request of (ii) from an electronic device of the payer.

Another aspect of the disclosure provides a system for facilitating a merchant transaction, comprising one or more computer processors and a memory location coupled to the one or more computer processors. The memory location comprises code that, upon execution by the one or more computer processors, implements a method, the method comprising: (i) providing a list of one or more merchants that are in proximity to a geolocation of a payer; (ii) receiving a request from the payer to conduct a transaction with a merchant among the one or more merchants; and (iii) processing the transaction with the aid of a computer processor, wherein a tip selection is automatically applied to the transaction without involvement from the payer during or upon the termination of the transaction. In an embodiment, the system is adapted to provide the list of (i) on a graphical user interface of an electronic device of the payer. In another embodiment, the system is adapted to receive the request of (ii) from an electronic device of the payer.

Another aspect of the disclosure provides a system for facilitating a transaction between a merchant and a payer, comprising one or more computer processors and a memory location coupled to the one or more computer processors. The memory location comprises code that, upon execution by the one or more computer processors, implements a method, the method comprising: (i) providing, in a merchant card displayed on a graphical user interface (GUI) of an electronic device of the payer, information of or related to the merchant with which the payer has requested to conduct a transaction, wherein the merchant card includes one or more input fields, each of which one or more input fields is for permitting the payer to provide a tip selection to be applied to the transaction; (ii) receiving, with the aid of the GUI, a tip selection from the payer, wherein the tip selection is provided by the payer in a given input field of the one or more input fields; and (iii) processing, with the aid of a computer processor, the transaction between the payer and the merchant, wherein the tip amount is applied to the transaction.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGS." herein) of which:

DETAILED DESCRIPTION

Figure 1:
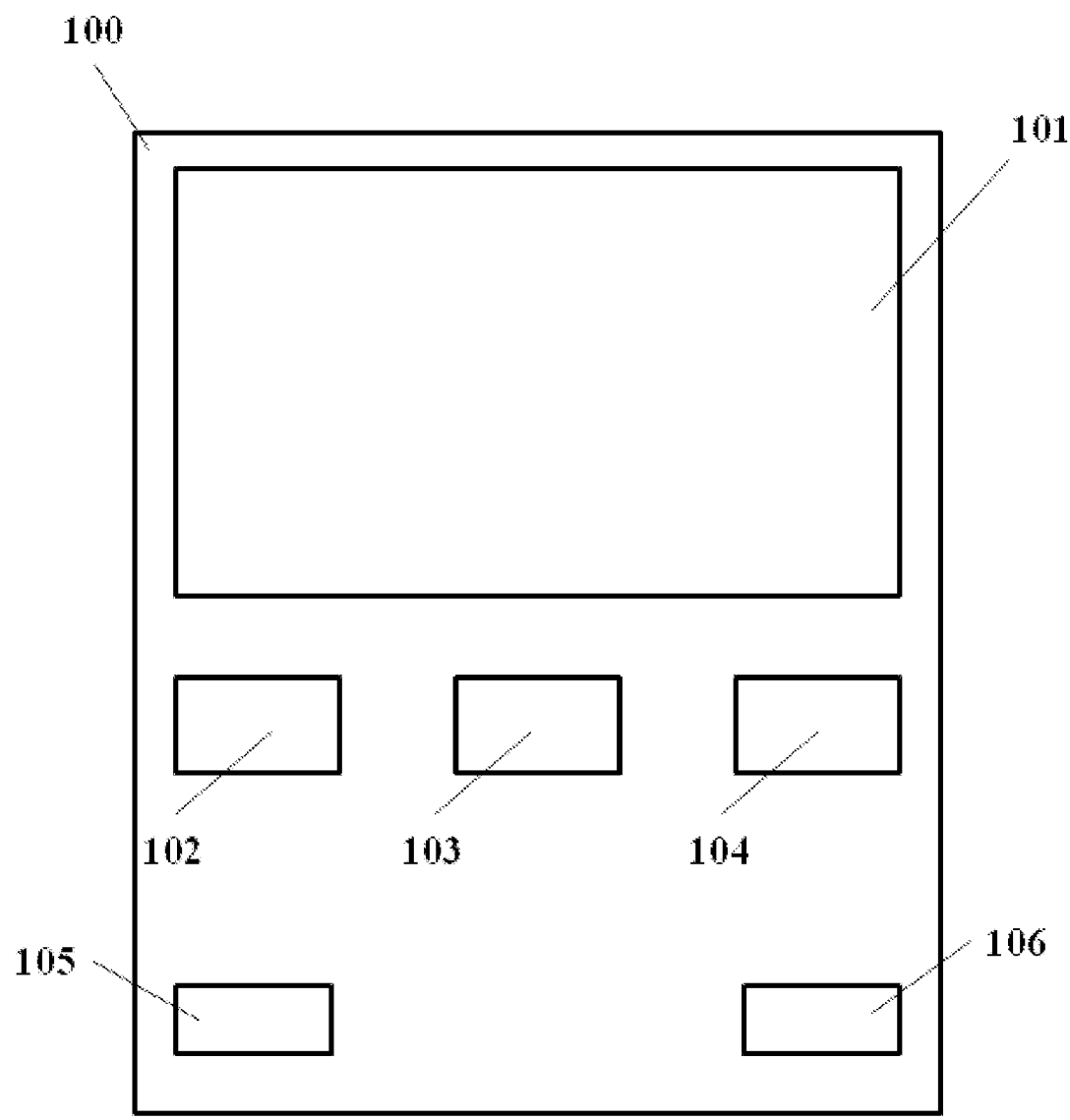
FIG. 1 schematically illustrates a merchant chard, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "merchant," as used herein, generally refers to an individual, business or other entity, the occupation of which is the sale of goods for profit, trade of an item of value for another item of value, and/or the rendering of a service. In an example, a merchant is a retail business or a shopkeeper. A merchant may be an online business or entity offering a product or service for profit of trade. Examples of merchants include, without limitation, food stores, grocery stores, electronic stores, department stores, bars, clubs, restaurants and book stores.

The term "user," as used herein, generally refers to an individual or entity that uses systems and methods of the disclosure. A user can be an individual or entity that wishes to purchase a product or service of a merchant. A user can be a "payer," which generally refers to one or more users that are conducting, or have conducted, a transaction with a merchant.

The term "tip" (also "gratuity" herein), as used herein, generally refers to money or other consideration tendered to a merchant based on a payer's satisfaction (or dissatisfaction) with the merchant. A tip may be a sum of money or other consideration that is provided on top of the money or consideration requested by a merchant for a product or service provided or to be provided by the merchant. In an example, a payer provides a merchant a tip in the amount of $1 for a $3 cup of coffee provided by the merchant.

The term "geographic location" (also "geo-location" and "geolocation" herein), as used herein, generally refers to the geographic location of an object, such as a user. A geolocation of a user can be determined or approximated using a geolocation device or system associated with the user, which may be an electronic device (e.g., mobile device) attached to or in proximity to the user. Geolocation information can include the geographic location of the object, such as coordinates of the object and/or an algorithm or methodology to approximate or otherwise calculate (or measure) the location of the object, and, in some cases, information as to other objects in proximity to the object. In some examples, geolocation information of a user includes the user's geographic location and/or the location of one or more merchants in proximity to the user. Geolocation information can include the relative positioning between objects, such as between users, or a payer and a merchant. In some cases, the geolocation of an object (e.g., user, electronic device) is not necessarily the location of the object, but rather the location that the object enters an area or structure, such as a building.

A geolocation device may be a portable electronic device (e.g., Apple® iPhone®, Android® enabled device). In some cases, the geolocation of an object can be determined using the manner in which a mobile device associated with the object communicates with a communication node, such as a wireless node. In an example, the geolocation of an object can be determined using node triangulation, such as, e.g., wireless node, WiFi node, satellite triangulation, and/or cellular tower node triangulation. In another example, the geolocation of a user can be determined by assessing the proximity of the user to a WiFi hotspot or one or more wireless routers. In some cases, the geolocation of an object can be determined using a geolocation device that includes a global positioning system ("GPS"), such a GPS subsystem (or module) associated with a mobile device (e.g., GPS capabilities of an Apple® iPhone® or Droid® based system).

In some situations, the geolocation of an object can be determined with the aid of visual and/or audio information captured by an electronic device of a user, such as, for example, images and/or video captured by a camera of the electronic device, or a peripheral device (e.g., Google® Goggles) coupled to the electronic device.

Merchant Cards

An aspect of the invention provides a computer-implemented method for facilitating a transaction between a merchant and a payer. The method comprises providing, in a merchant card displayed on a graphical user interface (GUI) of an electronic device of the payer, information of or related to the merchant with which the payer has requested to conduct a transaction. The merchant card includes one or more input fields, each of which can be for enabling the payer to provide a tip selection. An input field can include a selectable element, such as, for example, a predetermined tip amount. A tip selection can include a tip amount to be provided to the merchant. Next, with the aid of the GUI, the tip amount (or gratuity) is received from the payer. The transaction between the payer and the merchant is then processed with the aid of a computer system having on or more processors programmed to facilitate the transaction. During or upon the termination of the processing of the transaction, the tip amount is applied to the transaction.

In some cases, the one or more input fields include various tip options, such as, for example, predetermined tip amounts. For example, the input fields can include tip amounts that are selected based on merchant type or set for specific merchants (e.g., Starbucks® has tip amounts that are different from Philz Coffee™). As another example, the input fields can include tip amounts that are pre-selected by the payer (e.g., regardless of who the merchant is, or can be preselected for certain merchant types or specific merchants).

Tip amounts can be set by the computer system, the merchant or the payer. For example, the payer can select an automatic tip amount or a selection of tip amounts for Starbucks® and a different automatic tip amount or selection of tip amounts for Philz Coffee™.

The input fields can be graphical icons that correspond to a designated tip amount. An input field can be a graphical element, such as an icon or button. In an example, an input field is a button or other graphical element having text with a predetermined (e.g., payer-selected, merchant-selected) tip amount. Alternatively, the input fields can enable the payer to input a tip amount.

A merchant card can be displayed on a user interface, such as a graphical user interface (GUI), of an electronic device of the payer. A GUI can include one or more graphical items that correspond to various features or functionalities. For example, a merchant card can include a button or other graphical item that enables the payer to share a merchant card with another user (e.g., payer), such as, for example, through electronic mail ("email"), text messaging, or other electronic interface. As another example, a merchant card can include a button or graphical item to enable the payer to save or minimize the merchant card.

A merchant card can be dedicated to a given merchant. In some examples, a merchant card includes one or more tip amounts that are specific to the merchant. The computer system can provide the payer with merchant-specific tip amounts during or upon the termination of the processing of the transaction between the payer and the merchant.

A merchant card can permit a payer to initiate and conduct an electronic transaction with a merchant associated with the merchant card. The electronic transaction can over a network, such as the Internet or an intranet. In some examples, a merchant card permits a payer to open a tab with a merchant. The merchant card can permit a payer to initiate a transaction between the payer and the merchant.

A merchant card can be selected to provide additional details of a given merchant, such as the name of the merchant, the distance of the payer from merchant (e.g., 1 mile), product or service details, costs associated with products and/or services of the merchant, the location of the merchant, directions to the merchant, hours of operation of the merchant, and promotions offered by the merchant. The payer may select to open a tab with the merchant to initiate a process to purchase a product or service from the merchant.

A merchant card can include one or more graphical items as tip options for a payer. For example, a merchant card can include at least 1, 2, 3, 4, 5, 6, 7, 8, 9, 10, 20, 30, 40, or 100 tip options. A tip option can include a currency or other consideration option (e.g., $1, $2, or $5, or 5%, 10%, 15% or 20%), the option to not provide a tip, or the option to provide a tip at a later point in time. In an example, a merchant card includes a plurality of icons (or buttons, or other graphical items), with each icon being associated with a given tip amount and/or an option to not provide a tip or provide a tip later (e.g., before or after the tab is closed). The payer can elect an icon to apply to a given transaction with the merchant.

In some examples, a tip button on a merchant card can be visually different than another tip button on the merchant card. For example, if the payer ordinarily selects a given tip amount for a given merchant, the system can register the given tip amount as a preferred tip amount for that merchant and visually render the button (or icon) associated with the given tip amount to be visually different than the remainder of the buttons.

FIG. 1 shows a merchant card ("card") 100, in accordance with an embodiment of the invention. The card 100 can be provided on a GUI of an electronic device of a payer (e.g., Apple® iPhone, Apple® iPad, Android® enabled device, Blackberry® phone). The device may be coupled to a system having a processor that is configured to execute machine-executable code to facilitate a transaction between the payer and a merchant.

With continued reference to FIG. 1, the card 100 includes a graphical field 101 for displaying a logo or other information that can be specific to the merchant. The card 100 further includes tip (or gratuity) fields 102, 103 and 104 (also "tipping options" herein), which can include a select tip amount (e.g., "$1") or percentage of a transaction (e.g., "15%"), the option to not tip the merchant (e.g., "No tip"), or the option to tip later (e.g., "Tip later"). The tip fields (i.e., the number of tip fields and the tip options for a given tip field) can be merchant specific. For example, a first merchant can have a different number of tip fields than a second merchant. As another example, the first merchant can have different tip options than the second merchant.

The gratuity fields can be provided in a row, column, array, grid, or any other manner. The gratuity fields can be adjacent to one another. Amounts and/or percentages associated with the gratuity fields can be provided in increasing or decreasing order. In some cases, a given gratuity field can look visually different than one or more other gratuity fields—e.g., based on what the system deems is the most likely gratuity the payer would select, as can be determined from historical tipping data with the merchant. In some examples, the system can make the given gratuity field more or less visually appealing to the payer.

The card 100 includes a button 105 for enabling the payer to save, minimize or close the card 100. In some examples, the button 105 enables the payer to close the card 100 and reveal other another card with other information on the merchant associated with the card 100, or, alternatively, reveal a list of merchants or one or more cards associated with merchants.

The card 100 includes a button 106 that enables the payer to share the card 100 with another user, such as, for example, another payer. In an example, the button 106 can be configured to enable the payer to share the card with another user through email, text or other electronic interface.

The look and feel of a merchant card can be tailored based on user-specific merchant criteria. In some cases, the shape or color of a button or input field on a card can be selected to make it more or less appealing to a user than another button or input field. Such modification may be made to increase the likelihood of the user selecting one field over another field. In some examples, a first tip amount can be selected to be more appealing than another tip amount. For example, a tip amount that the computer system determines is most likely to be selected by the payer can be made to be more appealing to the payer than another tip amount that the computer system determines is less likely to be selected by the payer.

In some examples, the payer can change the look of the merchant card, such as, for example, by changing the orientation of the tipping options (e.g., rows, columns, grid) and the manner in which tipping options are provided to the payer or a tipping selection is retrieved from the payer. For example, the payer may wish that the system provide the payer tipping options. Alternatively, the payer may wish to input a tipping selection, such as inputting a tipping amount. The payer can select a tipping option or provide a tipping selection with the aid of a pointing device (e.g., computer mouse), the payer's finger (e.g., in cases in which the payer is using a resistive or capacitive touch screen), voice commands, gestures (e.g., with the aid of a motion sensing input device, such as Kinect®), or combinations thereof.

Systems for Facilitating Transactions

Another aspect of the invention provides a system that is configured (or programmed) implement the methods of the disclosure. The system can include a computer server ("server") that is operatively coupled to an electronic device of a user (e.g., payer) and an electronic device of a merchant.

Figure 2:
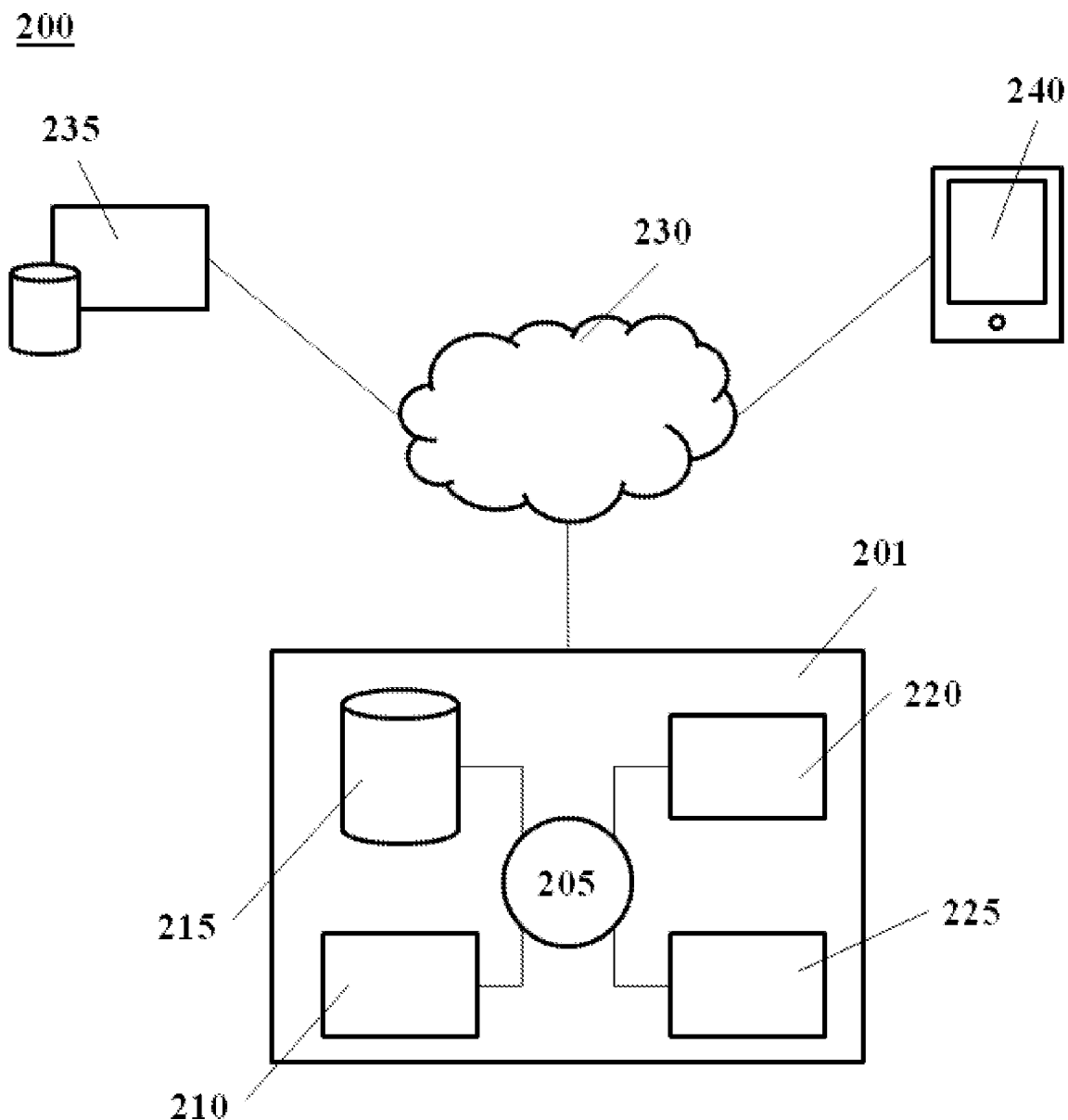
FIG. 2 schematically illustrates a system for facilitating methods of the disclosure, in accordance with an embodiment of the invention.

FIG. 2 shows a system 200 adapted to enable a payer to search for merchants, in accordance with an embodiment of the invention. The system 200 includes a central computer system or server ("server") 201 that is programmed to implement example methods described herein. The server 201 includes a central processing unit (CPU, also "processor" and "computer processor" herein) 205, which can be a single core or multi core processor, or a plurality of processors for parallel processing. The server 201 also includes memory 210 (e.g., random-access memory, read-only memory, flash memory), electronic storage unit 215 (e.g., hard disk), communications interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communications bus (solid lines), such as a motherboard. The storage unit 215 can be a data storage unit (or data repository) for storing data. The server 201 is operatively coupled to a computer network ("network") 230 with the aid of the communications interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230 in some cases, with the aid of the server 201, can implement a peer-to-peer network, which may enable devices coupled to the server 201 to behave as a client or a server.

The storage unit 215 can store files, such as filed related to merchant profiles and/or accounts, and payer profiles. The server 201 in some cases can include one or more additional data storage units that are external to the server 201, such as located on a remote server that is in communication with the server 201 through an intranet or the Internet.

The storage unit 215 can store payer and merchant transactional information. The storage unit 215 can store payer transactional information, which can include, without limitation, merchants from which the payer has purchased products and/or services, the number of times the payer has used a merchant, the frequency with which the payer purchases products and/or services from a merchant, the types of merchants from which the payer purchases products and/or services. The data storage unit 215 can include payer tip information, such as tip settings and preferences, and a history of previous transactions with tip amounts.

The server 201 can be programmed to enable a user (e.g., payer) to elect various tipping settings. For example, a payer may wish that a tip be automatically applied to a given transaction ("automatic tipping"), and the server 201 can provide the payer the option to elect automatic tipping. As an alternative, a payer may wish to be asked to provide a merchant a tip in a transaction ("selectable tipping"), and the server 201 can provide the payer the option to request selectable tipping, in which case the server 201 can provide the payer various tipping options during a transaction.

The server 201 can communicate with one or more remote computer systems through the network 230. In the illustrated example, the server 201 is in communication with a first computer system 235 and a second computer system 240 that are located remotely with respect to the server 201. In the illustrated example, the first computer system 235 is a merchant computer system that may have a database for recording transaction data, and the second computer system 240 is a user computer system, such as a computer system of a potential purchaser (e.g., payer) of a service or product of the merchant. The first computer system 235 and second computer system 240 can be, for example, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants.

In some examples, the second computer system 240 includes a passive screen, a capacitive touch screen, or a resistive touch screen. The computer system 240 can include a network interface and a browser that enables a payer to access various sites or locations on an intranet or the Internet. The computer system 240 can include an application ("app") that enables the computer system 240 to interact with the server 201. The app can be implemented with the aid of machine executable code, or software. The app can be configured to enable the computer system to communicate with a server, such as the server 201, which facilitates a transaction between the payer and a merchant.

In an example, the second computer system 240 is a portable electronic device of a payer that desires to search for and find merchants at or in proximity to a geolocation of the payer. The payer can access the server 201 via the network 230 to request the search. The server 201 can conduct the search and transmit search results to the second computer system 240 of the payer. The search results can be displayed on a graphical user interface of the second computer system 240. In some cases, both the first computer system 235 and the second computer system 240 have a geolocation.

In some situations the system 200 includes a single server 201. In other situations, the system 200 includes multiple servers in communication with one another through an intranet and/or the Internet.

The server 201 can be adapted to store user (e.g., payer, merchant) profile information, such as, for example, a name, physical address, email address, telephone number, instant messaging (IM) handle, educational information, work information, social likes and/or dislikes, products likes and/or dislikes, merchant preferences, favorites types of merchants (e.g., restaurants preferred over bars) and historical information of past transactions of the user (which may be transactions made using the system 200), and other information of potential relevance to the user or other users. Such profile information can be stored on the storage unit 215 of the server 201.

Methods as described herein can be implemented by way of machine (or computer processor) executable code (or software) stored on an electronic storage location of the server 201, such as, for example, on the memory 210 or electronic storage unit 215. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210. Alternatively, the code can be executed on the second computer system 240 of the user.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the server 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, the server 201 can be configured for data mining, extract, transform and load (ETL), or spidering (including Web Spidering where the system retrieves data from remote systems over a network and access an Application Programmer Interface or parses the resulting markup) operations, which may permit the system to load information from a raw data source (or mined data) into a data warehouse. The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+®, Linkedin®) or on publisher sites, such as, for example, weblogs.

The results of a user-initiated search for merchants can be presented to a user with the aid of a user interface (UI), such as a graphical user interface (GUI), on an electronic device of the user. In some situations, a GUI can enable a user to access the results of a search for entertainment events at a designated geographic.

The UI, such as GUI, can be provided on a display of an electronic device of the user that is adapted to provide geolocation information of the user, such as, for example, measure (or calculate) the geolocation of the user. The display can be a capacitive or resistive touch display, or a head-mountable display (e.g., Google® Goggles). Such displays can be used with other systems and methods of the disclosure.

Methods of the disclosure may be facilitated with the aid of an application ("app") that can be installed on electronic devices of a user. An app can include a GUI on a display of the electronic device of the user. The app can be configured to perform certain functions of the system, such as, for example, permitting a user to initiate a transaction with a merchant if the user is within a given distance from the merchant. In an example, if the user is within a given distance from the merchant, the app can permit the user to request to initiate a transaction with the merchant, which request is directed to the system. The system can then inform the merchant that the user desires to initiate a transaction with the merchant, and the transaction can be subsequently processed with the aid of the system, as described elsewhere herein.

Systems of the disclosure may include both payer and merchant data. This advantageously permits a system to determine relevance ranking that may be user specific and directed at select one or more merchants or types of merchants. The system may be owned and/or operated by a single entity.

In some cases, the merchant and/or payer information may be stored in a memory location of the system. Accordingly, relevance ranking may be a function of both payer and merchant information. For instance, a merchant may intent to target payers of a given age group. In some cases, a search for merchants by a payer may provide merchants that consider the payer to be relevant to the merchants.

The computer system 201 can be programmed to implement various methods disclosed herein. In some embodiments, the computer system 201 can facilitate payment from the user to the merchant. In an example, the system transfers funds to the merchant and receives funds from the user. The funds received from the user may be greater than or equal to the funds transferred to the merchant. In another example, the system transfers funds directly from the user to the merchant.

In some embodiments, the computer system 201 is configured to initiate and facilitate a transaction between a payer and a merchant. In an example, the computer system 201 initiates and facilitates the transaction between the user and the merchant if the user is within a given distance from the merchant. The distance can be based upon a determination of the geolocation of the user. For instance, a geolocation device of the user can determine the geographic information of the user, and direct the geographic information to the system. If the user is within a given (e.g., predetermined) distance from the merchant, the system can permit the user to initiate a transaction with the merchant (e.g., open a tab). In some situations, the user's geolocation device, upon determining that the user is within a given distance from the merchant, permits the user to initiate a transaction with the merchant with the aid of the system.

Methods for Providing Gratuities

Another aspect of the invention provides computer-implemented methods for facilitating a merchant transaction. In some embodiments, a method for facilitating a merchant transaction comprises providing a list of one or more merchants that are in geographic proximity to a geolocation of a payer. The one or more merchants can be within a given distance from the geolocation of the payer. The list can be provided by a central computer system (or server) that is coupled to an electronic device of the payer.

In some examples, the list is populated by merchants that are within 0.1 miles, 0.2 miles, 0.3 miles, 0.4 miles, 0.5 miles, 1 mile, 1.5 miles, 2 miles, 2.5 miles, 3 miles, 3.5 miles, 4 miles, 4.5 miles, 5 miles, 6 miles, 7 miles, 8 miles, 9 miles, 10 miles, 20 miles, 30 miles, 40 miles, 50 miles, 100 miles, or 500 miles with respect to the geolocation of the payer. The list can be provided to the payer upon a search—within, for example, a search radius, which may be selected by the payer—by the payer for one or more merchants that are a given distance from a geolocation of the payer. The list can be provided on a user interface, such as graphical user interface (GUI), of an electronic device of the payer. The one or more merchants can be provided on the GUI based on (i) the proximity of the payer to each of the one or more merchants and (ii) the relevance of each of the one or more merchants to the user as determined from one or more relevance criteria.

The geolocation of the payer can be determined with the aid of a geolocation device of the payer. The payer can then request to conduct a transaction with a merchant among the one or more merchants. The request can be directed from an electronic device of the payer to the server (e.g., computer system 201 of FIG. 2), which can be programmed to facilitate the transaction. In some examples, the payer can select to open a tab with a merchant, which can enable the payer to select a product or service from the merchant to purchase.

Upon receiving the request, the server can inform the merchant that the payer has requested to conduct a transaction with the merchant. The server, in some examples, can notify the merchant by directing an electronic communication or other notification to a computer system of the merchant, which computer system can include an app that enables the merchant to interact with the server.

In some cases, the request can be received from an electronic device of the payer, such as a portable electronic device. The portable electronic device can include a user interface (UI), such as a graphical user interface (GUI), which can enable the user to initiate the transaction between the user and the merchant and to view the status of any rewards the user has with the merchant, as well as any promotions offered by the merchant to the user. In some examples, the server permits the payer to request to conduct the transaction if the payer is at or in proximity to the merchant. For instance, the server will permit the payer to request to conduct a transaction with a merchant that is within about 0.1 miles, 0.2 miles, 0.3 miles, 0.4 miles, 0.5 miles, 1 mile, 1.5 miles, 2 miles, 2.5 miles, 3 miles, 3.5 miles, 4 miles, 4.5 miles, 5 miles, 6 miles, 7 miles, 8 miles, 9 miles, 10 miles, 20 miles, 30 miles, 40 miles, 50 miles, 100 miles, or 500 miles with respect to the geolocation of the payer. In some examples, the server will initiate the transaction if the payer is at or in proximity to the merchant.

The merchant can be at or in proximity to a geolocation of the user. The geolocation can be determined with the aid of a geolocation device of the user. In some examples, the request is received by the server from the geolocation device of the payer. The geolocation of the payer can be determined prior to the computer system providing the payer a list of one or more merchants.

During or upon the processing of the transactions, the payer can be provided with the option to provide the merchant a gratuity (or tip). The server in such a case can provide the payer one or more tip options (e.g., tip amounts), and from the one or more tip (also "tipping" herein) options the payer may make a tip selection. The payer can select a tip option to provide to the merchant. The one or more tipping options can include one or more tipping amounts, a tipping field in which the payer may enter a tip amount, the option to tip at a later point in time, and/or the option to not provide the merchant a tip.

Next, the server processes the transaction with the aid of a processor (or a plurality of processors) of the server. The processing can involve the server receiving a product or service request from the payer, and relaying the product or service request to the merchant. Each product or service request can include a request for one or more products and/or services of the merchant. The processing can include the server supplying the merchant consideration from (or on behalf of) the payer for the product or service requested by the payer. Any tip amount selected by the payer can be applied to the transaction during or upon the termination of the processing of the transaction.

Alternatively, the server does not provide the payer the option to provide the merchant a tip. Rather, the server automatically applies a tip selection to the transaction without any involvement from the payer during or upon the termination of the processing of the transaction. In such a case, automatic tipping can be applied if the server receives from the payer (or an electronic device of the payer) an indication that the tip selection is to be automatically applied to the transaction. For instance, the payer can elect automatic tipping from a tip settings GUI (see below). The tip selection can include a tip amount (e.g., $1, $5), a percentage of the transaction cost with the merchant (e.g., 5%, 10%, 20%), the election to tip at a later point in time, or the election to not tip the merchant. The tip selection can be merchant specific. For example, the payer may wish to provide a given merchant or a merchant of a given type (e.g., coffee shop) a given tip amount. As another example, the payer may wish to supply a merchant a tip amount that is a given percentage of the transaction cost. As another example, the payer may wish to automatically provide a merchant a 15% or 20% gratuity with each transaction. In such cases, the server automatically calculates and applies a gratuity without any involvement from the payer during or upon the termination of the processing of the transaction.

In some examples, once the transaction has been processed, the server provides the payer a receipt of the transaction. The receipt can include information as to one or more products and/or services obtained by the payer from the merchant, including any tip applied to the transaction.

Systems of the disclosure can be programmed to maintain a record of user (e.g., payer) transactions with a given merchant, including gratuities supplied in transactions with merchants. Additionally, systems of the disclosure can be programmed to provide a payer tipping settings, which can enable the payer to select tipping options. For example, tipping settings can provide a payer the option to automatically tip a given merchant (e.g., the payer can select a merchant from a list of merchants to tip automatically), all merchants, all merchants of a given type, all merchants meeting certain conditions (e.g., location of merchant, proximity of a merchant to another merchant) that can be supplied by the payer, or other rules or conditions that can be supplied by the payer.

Alternatively, the payer can elect various settings, which can enable the server to provide the payer the option to tip a merchant prior to, during or upon the completion of the processing of a transaction between the payer and the merchant. In some cases, tipping is not manual and the payer is given the option to provide the merchant a tip. The payer can provide the merchant a tip amount from tipping options selected by the server, the merchant, or inputted by the payer.

In some cases, a system programmed to facilitate payer-merchant transactions (e.g., the computer system 201 of FIG. 2) maintains a record of user transactions with a given merchant. The record can include produces and/or services purchased from merchants and tips provided to the merchants in return for the products and/or services.

In some embodiments, a payer requests to initiate a transaction with a merchant by opening a tab with the merchant. Upon the completion of the transaction with the merchant, the tab is closed. In some cases, closing the tab marks the termination of processing with the merchant, though in other cases further processing (e.g., transfer of funds by the system, alternation of a previously selected tip amount by the payer) may continue after the tab is closed. After the tab is closed, the payer can open a new tab with the merchant, or open a new tab with another merchant.

In some embodiments, a payer can provide a tip before the payer knows the total transaction amount. Alternatively, the payer can provide the tip after knowing the transaction amount but before closing the tab with the merchant. In some situations, the payer can provide the tip after knowing the transaction amount and closing the tab with the merchant.

Systems of the disclosure can provide payers tipping options, including tipping amounts, tipping frequencies (e.g., provide a tip with each transaction or every other transaction), and whether to tip or not tip a merchant. In some examples, a system programmed to facilitate a transaction with a merchant (e.g., the computer system 201 of FIG. 2) can suggest a tip amount to a payer that is tailored to a merchant (i.e., merchant-specific). For example, the system can suggest that the payer provide a first merchant of a given type (e.g., coffee store) a tip amount that is different than a second merchant of the given type.

Figure 3:
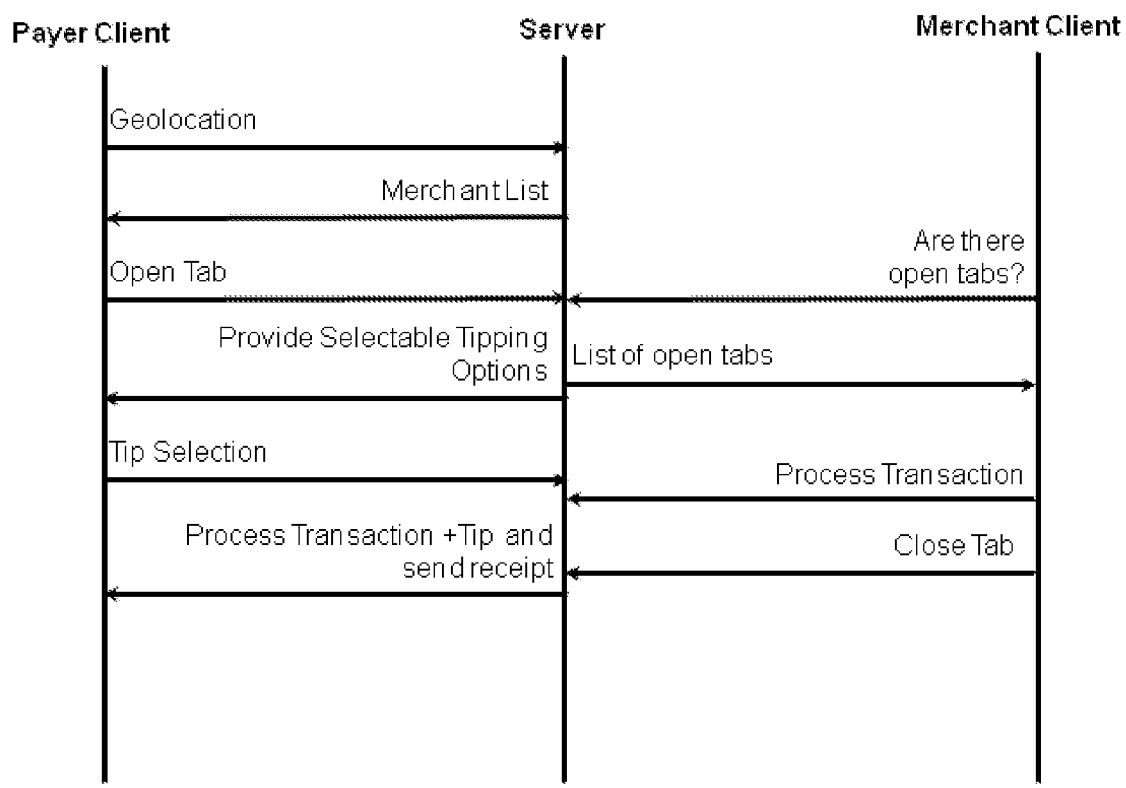
FIG. 3 schematically illustrates a transaction workflow in which a payer is provided a selectable tipping option, in accordance with an embodiment of the invention.

FIG. 3 shows a transaction method (or work-flow) in which a payer is provided a selectable tipping option, in accordance with an embodiment of the invention. The method is implemented upon the communication between the payer's electronic device, a computer system or server ("Server"), and a merchant's electronic device. The Server can be the computer system 201 of FIG. 2. The payer in such a case wishes to conduct a transaction with the merchant. The payer's client ("Payer Client") can be an electronic device, such as a portable electronic device, that is configured to communicate with the Server. The merchant's client ("Merchant Client") can be a computer system that is configured to communicate with the Server. The computer system can include one or more computers, each of which can include one or more processors for executing machine-readable code to implement a transaction.

Initially, the geolocation of the Payer Client is determined, which may be the geolocation of the payer, and directs geolocation information to the Server. Next, the Server provides the Payer Client a list of merchants based on one or more geolocation criteria of the payer, Server and/or the merchant. The one or more geolocation criteria of the payer can include distance of the payer from a given merchant. The Server can provide the Payer Client a list of merchants that are at or in proximity to the payer's geolocation. In some examples, the Server provides the Payer Client a list of merchants that are within 0.1 miles, 0.2 miles, 0.3 miles, 0.4 miles, 0.5 miles, 1 mile, 1.5 miles, 2 miles, 2.5 miles, 3 miles, 3.5 miles, 4 miles, 4.5 miles, 5 miles, 6 miles, 7 miles, 8 miles, 9 miles, 10 miles, 20 miles, 30 miles, 40 miles, 50 miles, 100 miles, or 500 miles with respect to the geolocation of the payer.

Next, the payer elects to initiate a transaction with a given merchant from the list of merchants. In some cases, the payer may wish to open a tab for the payer with the merchant. Upon the payer indicating in the Payer Client that the payer wishes to open a tab with the merchant, the Payer Client directs the request to open the tab to the Server. The Payer Client can transmit to the Server an indication to open a tab associated with an account of the payer, which can reflect an indication of the payer's consent to perform a transaction with the merchant. The transaction can be a cardless transaction in which a credit card is not used.

Next, the Merchant Client can send a request to the Server for a list of open tabs (e.g., a list of payer user accounts from which the Server has received indication of consent to enter into a cardless payment transaction). The Merchant Client can request the Server to provide a list of open tabs on a manual basis (e.g., upon merchant request), or at a given frequency, such as at least every 1 second, 2 seconds, 3 second, 4 seconds, 5 seconds, 10 seconds, 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, or 1 hour.

Next, the Server can provide the payer selectable tipping options. The selectable tipping options can include the option to not tip the merchant, tip the merchant at a later point in time, or both. In some examples, the selectable tipping options can include one or more tip amounts that are selected by the Server. For instance, the Server can provide the payer $1, $5 and $10 tipping options, or tipping options that are a fraction or percentage of the cost of the product(s) or service(s) offered by the merchant to the payer. As another example, the Server can enable the payer to input a tip amount, such as, for example, with the aid of a text input field, a drop-down menu with tipping amounts.

Next, the payer makes a tip selection and the Payer Client directs the tip selection to the Server. The Merchant Client then processes the transaction and provides transaction information to the Server. The transaction is processed with a tip amount, if any, applied to the transactions. For example, if the merchant has requested $5 for a product offered by the merchant to the payer and the payer wishes (and has elected) to tip the merchant $1 for the product, the transaction can be processed by providing the merchant $1+$5=$6. As another example, the payer has elected to provide the merchant a tip amount that is 20% of the $5 cost of the transaction between the payer and merchant, and the Server processes the transaction and provides the merchant $5+(0.2×$5)=$6.

The transaction between the payer and the merchant can be processed by, or with the aid of, the Server. For example, the Merchant Client can request a given consideration (e.g., funds) from the Server, and the Server can direct the consideration to the Merchant Client or a location designated by the merchant, such as a financial account or funds repository (e.g., bank account) of the merchant. The Server can also retrieve funds from the payer, such as retrieving funds from a financial account or funds repository (e.g., bank account, credit card) of the payer.

The merchant can request that the Server process the transaction with the payer, and the Merchant Client can request that the Server close the tab associated with the transaction with the payer. The Server can then process the transaction with the payer (by way of the Payer Client) and subsequently transmit an electronic receipt to the payer. Closing the tab can mark the termination of the processing of the transaction between the Merchant Client and the Server, but further processing between the Server and the Payer Client may be required. In some examples, after the Merchant Client requests to close the tab, the Server processes the transaction (e.g., directs funds to and/or from financial accounts, applies a tip). The electronic receipt can be directed to the Payer Client or other location designated by the payer, such as, for example, an email account or other electronic repository of the payer. The workflow of FIG. 3 can be suited for cardless payment transactions.

Figure 4:
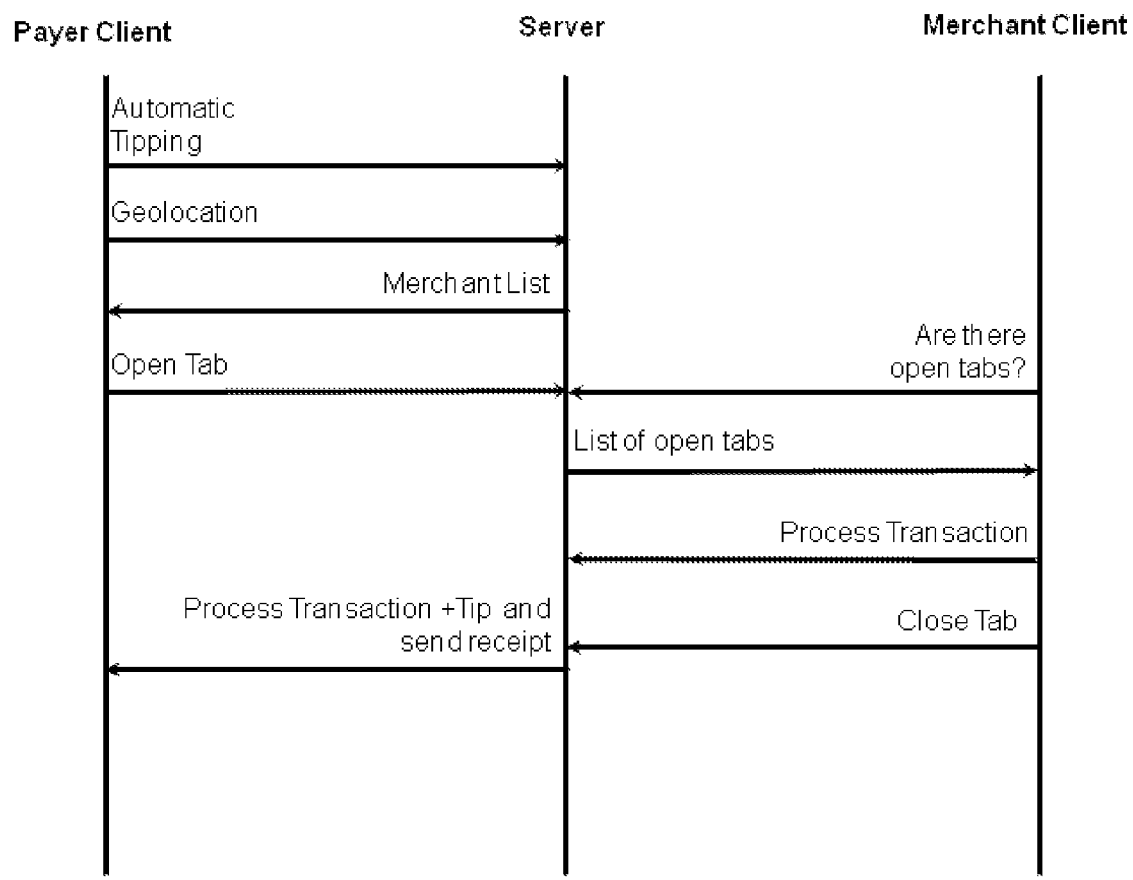
FIG. 4 schematically illustrates a transaction workflow in which a tip amount is automatically applied to a given transaction, in accordance with an embodiment of the invention.

In some cases, a merchant can be tipped automatically without any payer involvement during processing of a transaction between the payer and the merchant. FIG. 4 shows a workflow in which the Server automatically applies a tip to the transaction between the payer and the merchant. Upon processing the transaction between the payer and the merchant, the Server determines that the payer has elected to automatically tip the merchant, and the Server applies a given tip amount to the transaction. The tip amount can be selected by the payer prior to initiating the transaction with the merchant. The tip amount can be a fixed amount (e.g., $1), or a fixed percentage of the transaction cost (e.g., 20%). In some examples, under automatic tipping the tip amount can be a fixed amount or percentage for a given merchant or a given type of merchant. The tip amount can be automatically applied to the transaction during processing of the transaction (e.g., before closing the tab), upon the termination of processing of the transaction (e.g., upon closing the tab), or after a transaction has been processed (e.g., after closing the tab).

With reference to FIG. 4, the Payer Client initially instructs the Server that the payer has elected automatic tipping. The Payer Client then provides the server with geolocation information of the Payer Client, which can include the geolocation of the Payer Client. The Server then provides the Payer Client a merchant list. The Payer Client then requests to open a tab with a merchant selected from the merchant list. The Merchant Client queries the Server for any open tabs and the Server provides the Merchant Client a list of open tabs. The Merchant Client then requests that the Server process the transaction with the merchant (with the aid of the Payer Client), which includes retrieving a consideration for the transaction between the payer and the merchant. The Merchant Client then requests to close the tab with the Merchant Client. The Server then processes the transaction with the payer, which includes retrieving the consideration for the transaction in addition to any tip amount that is automatically applied to the transaction. The Server then provides the payer a receipt as described elsewhere herein.

The workflows of FIGS. 3 and 4 may be implemented in cash or card transactions, or cardless transactions. Cardless transactions can include transactions facilitated with the aid of systems provided herein, such as the computer system 201 of FIG. 2. In an example, in a cardless scenario a server facilitating a transaction between a payer and merchant, such as the computer system 201 of FIG. 2, provides funds to the merchant and receive funds from the payer.

In some embodiments, the payer and merchant can maintain a record of transactions. The record can be used to determine whether a gratuity (or tip) was applied at a given transaction. In some situations, under a selectable tipping option (see, e.g., FIG. 3), the Server can suggest a tip amount based on the payer's prior transaction history (including tipping history) with the merchant. For instance, if the payer has consistently tipped the merchant a given tip amount of percentage, then the Server can suggest that the payer tip the merchant the given tip amount. The record can be continuously or periodically updated to reflect various transactions.

In some examples, upon the Server processing a transaction between a merchant and a payer, the Server provides the Payer Client an electronic receipt of the transaction and an update on any rewards the payer may have with the merchant. With reference to FIG. 3, the Merchant Client instructs the Server to process payment associated with a given transaction with the payer. The Server processes payment, applies a tip, if any, and provides the payer an electronic receipt of the transaction. The electronic receipt can be provided to the payer via an electronic message, such as instant message, short-message service (SMS) text message, multimedia message service (MMS) text message, or electronic mail ("email"), or a message or other notification that is specific to the application implementing the transaction on the Payer Client (e.g., a device application, or "app"). In some cases, a GUI of an electronic device of the payer can be updated with information to reflect the transaction. In some situations, a merchant card on a GUI of the payer (or user) is updated to reflect the transaction.

In some embodiments, the Merchant Client is configured to search for open tabs and select payers to engage in transactions or decline invitations to engage in transactions with some payers.

Computer systems of the disclosure may be programmed to provide various tipping functionalities. A computer system can be configured to apply a tip to a given transaction either automatically (i.e., without payer involvement during processing) or by providing the payer a tipping option (i.e., selectable tipping). Under selectable tipping, the payer can elect from various tipping options, such as, for example, electing to not tip the merchant, tip the merchant at a later point in time, or provide the merchant a tip amount suggested by the system or provided by the payer. In some cases, if the payer elects to tip the merchant at a later point in time, the system can process the transaction and provide the payer the option to tip at a later point in time, which point in time may be selected by the payer (e.g., 5 minutes after the transaction is completed).

In some cases, the a payer can change a selected tipping option within a predetermined time frame, such as within at least 1 second, 2 seconds, 3 second, 4 seconds, 5 seconds, 10 seconds, 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 1 hour, 2 hours, 3 hours, 4 hours, 5 hours, 6 hours, 1 day, 2 days, 3 days, 4 days upon the termination of a transaction. In an example, the payer elects to tip a merchant $1 during processing of the transaction, and within 1 hour following termination of the transaction, changes the tip amount to $2. In another example, before the payer closes the tab the payer elects to tip the merchant $1 or a $1 is automatically applied to the transaction, and after the tab is closed the payer changes the tip amount to $2. In some cases, the system will permit the payer to change a tip amount within a given timeframe, such as, for example, within 1 second, 2 seconds, 3 second, 4 seconds, 5 seconds, 10 seconds, 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 1 hour, 2 hours, 3 hours, 4 hours, 5 hours, 6 hours, 1 day, 2 days, 3 days, 4 days of closing the tab.

Figure 5:
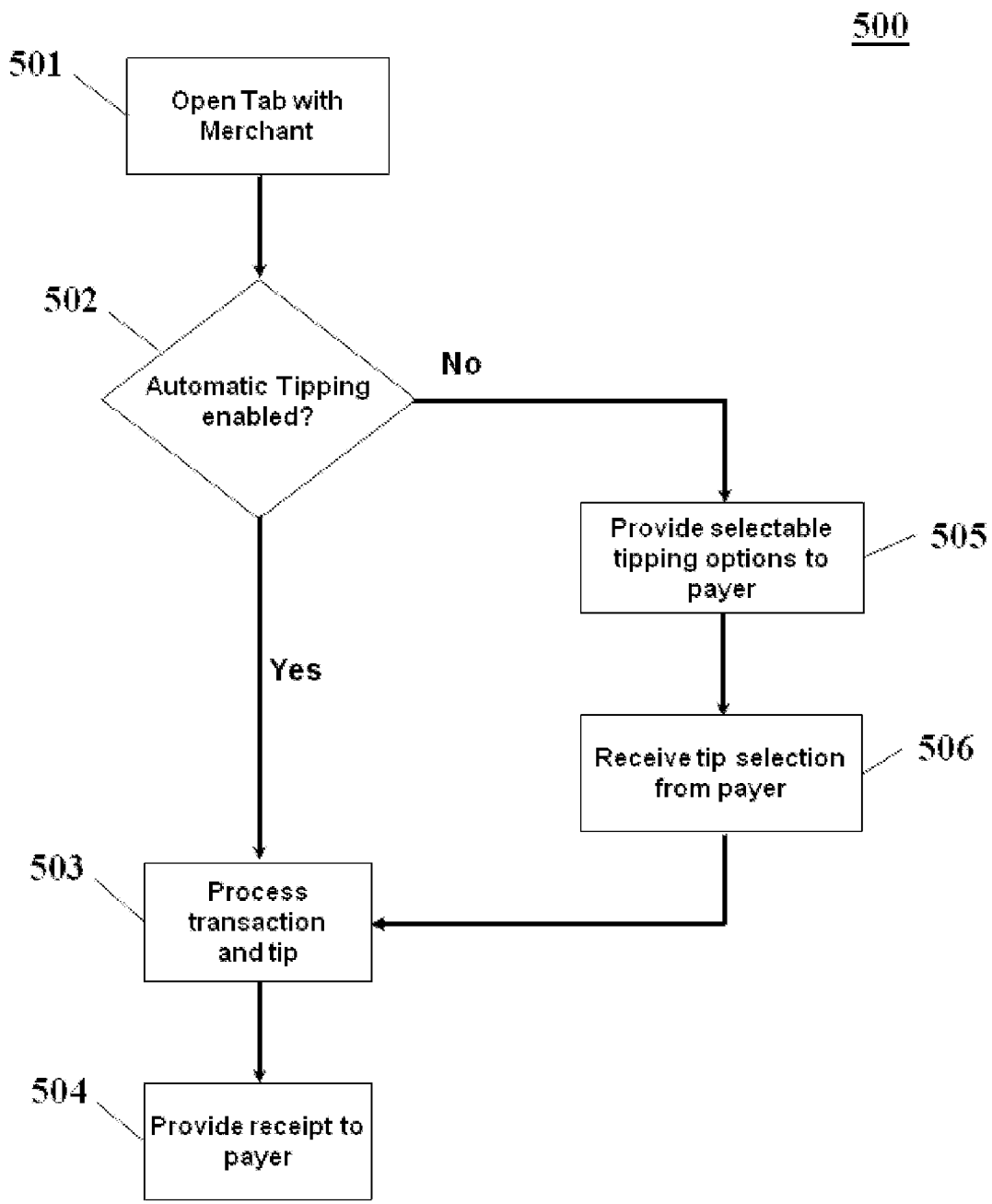
FIG. 5 schematically illustrates a transaction workflow for tipping a merchant, in accordance with an embodiment of the invention.

FIG. 5 shows a method for merchant tipping, in accordance with an embodiment of the invention. The method can be implemented with the aid of a computer system (or server), such as the computer system 201 of FIG. 2. In a first operation 501, a payer opens a tab with a merchant. Next, in a second operation 502, the server determines whether the payer has enabled automatic tipping. If automatic tipping has been enabled by the payer ("Yes"), then in a third operation 503 the server processes the transaction and the tip is automatically applied to the transaction. Next, in a fourth operation 504, the server provides the payer a receipt. Alternatively, if in the second operation 502 the server determines that automatic tipping has not been enabled by the payer ("No"), then in a fifth operation 505 the server provides the payer with selectable tipping options. In a sixth operation 506 the server receives a tip selection from the payer, which is then applied to the transaction upon processing in the third operation 503.

EXAMPLES

Figure 6A:
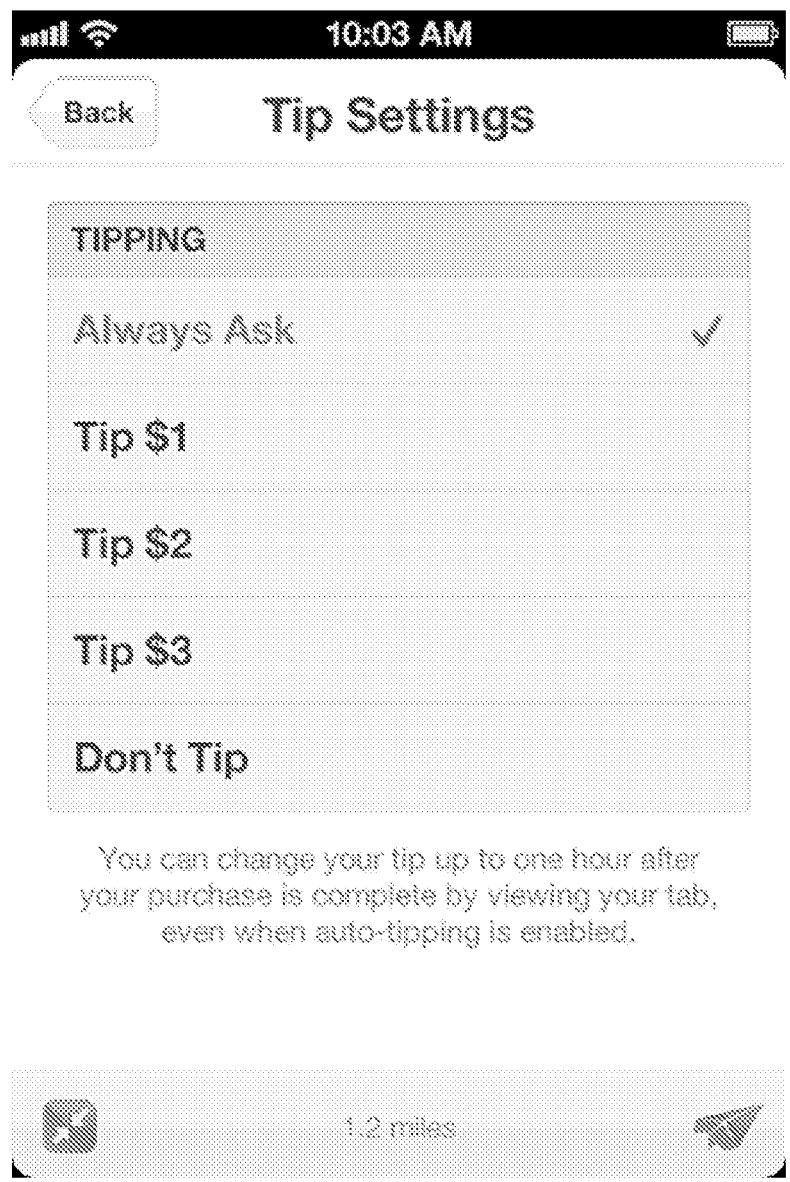
FIG. 6A shows a screenshot of a tip settings graphical user interface (GUI)
Figure 6B:
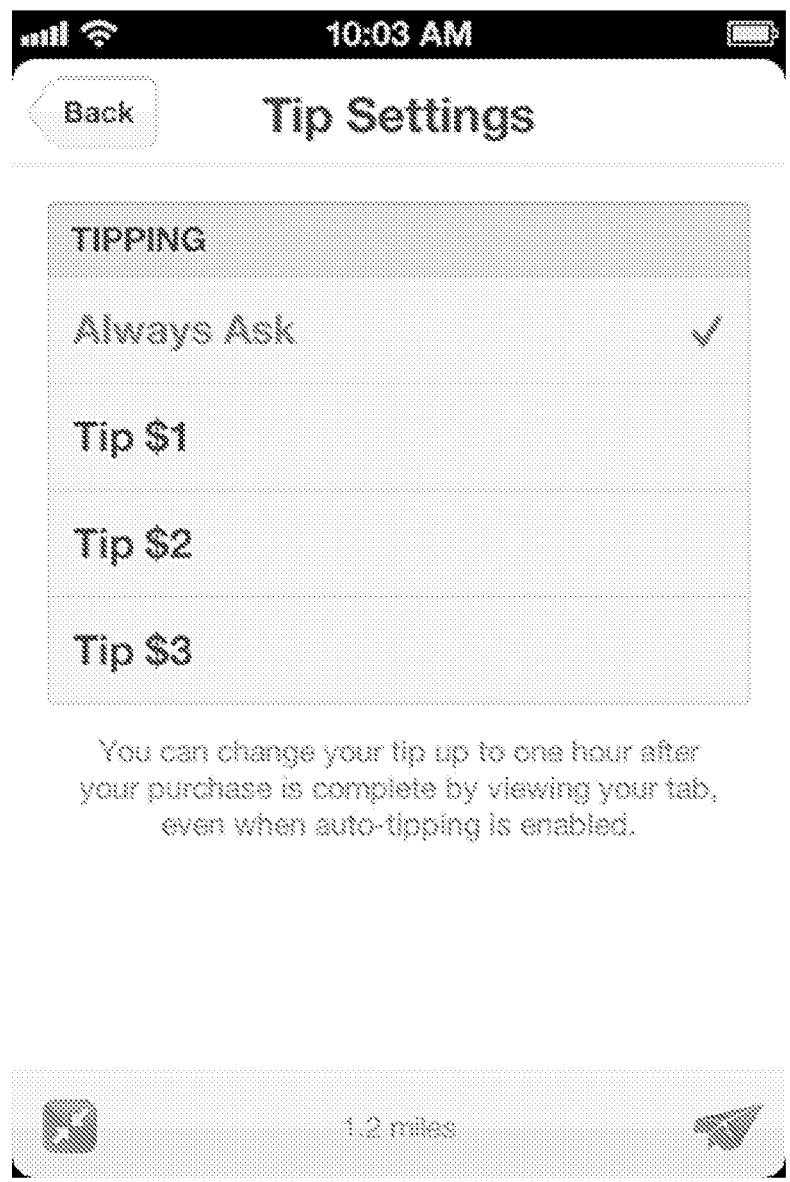
FIG. 6B shows a screenshot of another tip settings GUI.
Figure 7:
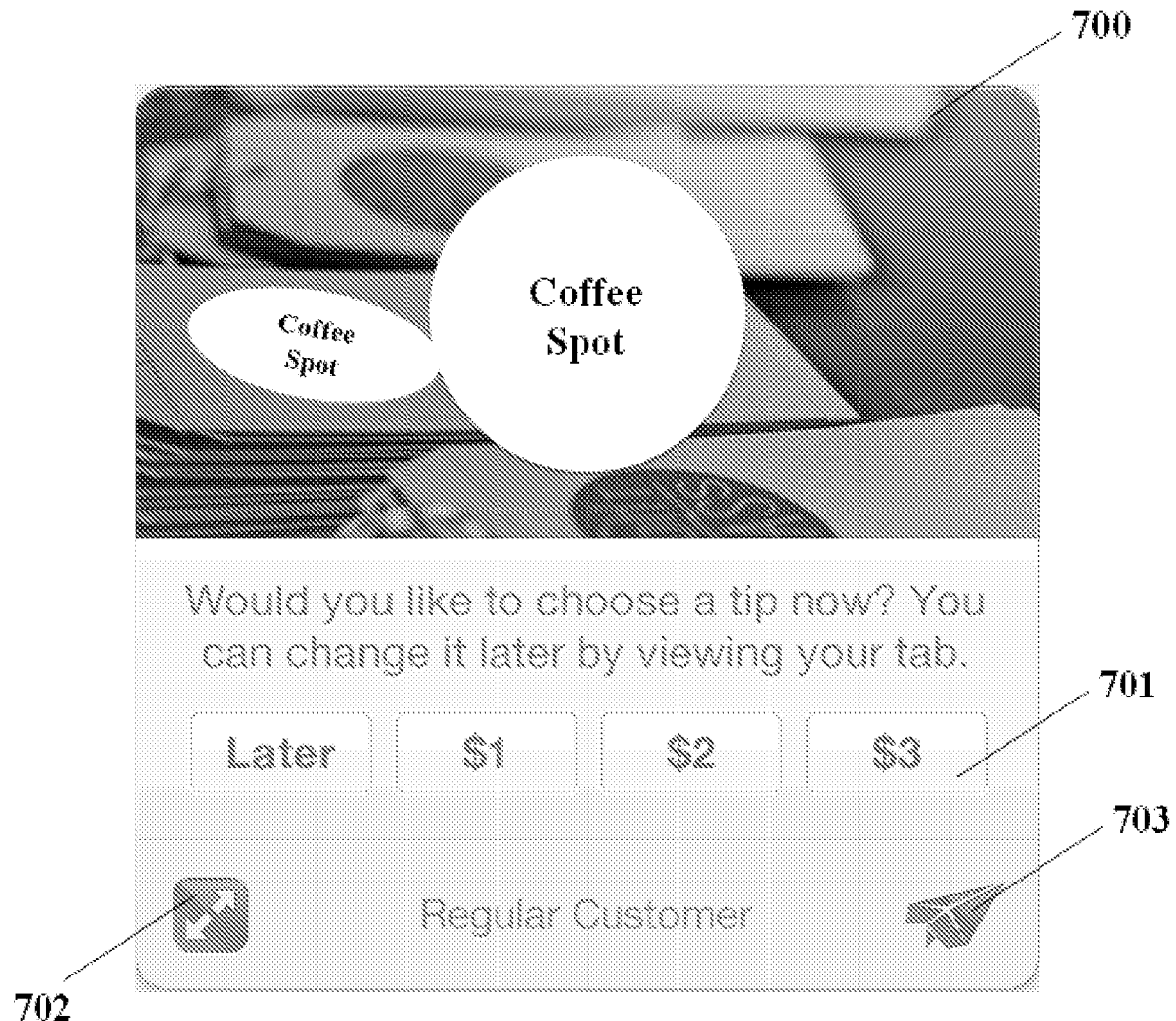
FIG. 7 shows a screenshot of an example merchant card having various payer-selectable tipping options.
Figure 8:
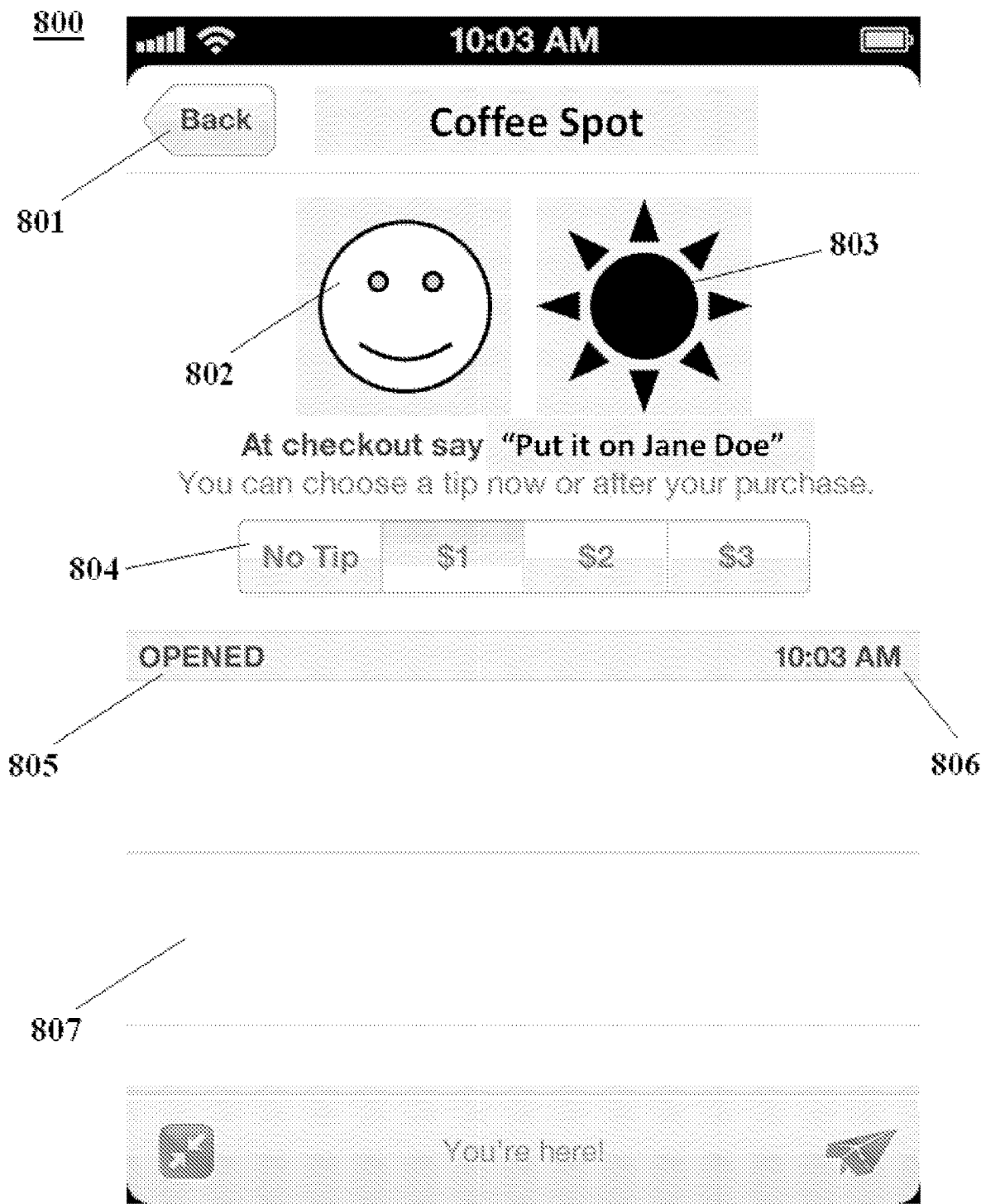
FIG. 8 shows a screenshot of a GUI that enables a payer to supply a tip to a merchant.

FIGS. 6-8 show example screenshots of graphical user interfaces (GUI's) on a display of an electronic device (e.g., mobile device) of a payer. The GUI can be implemented with the aid of an app on the electronic device. The app is configured to enable the mobile device to communicate with a server, such as the server 201 of FIG. 2, which can facilitate a transaction between the payer and a merchant.

FIG. 6A shows a screenshot of a tip settings menu on a graphical user interface (GUI) of an electronic device of a payer. The tip settings can be global tip settings, which can apply to all merchants or a group of merchants, or can be merchant specific. The payer can access the tip settings menu from a home screen of an app implementing the tip settings, or from a merchant card. In some examples, the payer can select tipping settings that are specific to a merchant.

The tip settings can provide the payer the option to select various tipping functionalities. The payer can elect that the server always ask the payer whether the payer wishes to provide a tip ("Always Ask"). In such a case, the server can provide the payer one or more tipping options during the processing of a transaction with a merchant, or, as an alternative, the payer can input a tip selection. As an example, the server can provide the merchant $1, $5 and $10 tipping options, or 5%, 10%, 15% and 20% tipping options. Alternatively, the payer can elect to have the server automatically provide a tip of a given amount or percentage ("Tip $1", "Tip $2", "Tip $3") to the merchant, or to not tip ("Don't Tip") the merchant. FIG. 6B shows a screenshot of an alternative tip settings menu on a GUI of an electronic device of the payer, in which "Don't Tip" is not included as a tipping option for automatic tipping.

The payer can change a tip amount within a given time frame, in some cases even if automatic tipping is enabled. In the illustrated examples of FIGS. 6A and 6B, the payer can select a different tip option (e.g., different tip amount, elect to not tip a merchant) within one hour after the payer's purchase of a product or service from the merchant is complete by viewing the payer's tab with the merchant.

In some cases, the tip settings can enable the payer to select the number (e.g., 1 option, 2 options, 3 options, 4 options, 5 options) and/or type (e.g., currency, percentage of transaction) of tip options from which the payer can make a tip selection with a given merchant, type of merchant (e.g., coffee shop), group of merchants (e.g., all coffee shops in Palo Alto), or all merchants (i.e., global settings). Alternatively, the number and/or type of tip options are fixed by the merchant or by the system, such as, for example, fixed by the system for a type of merchant, group of merchants, or all merchants.

FIG. 7 shows a screenshot of an example merchant card 700 with various selectable tipping options. In the illustrated example, the payer is conducting a transaction with Coffee Spot, a merchant. During processing of the transaction, the server provides the payer the ability to elect various tipping options 701 ("Later," "$1", "$2", "$3"). The payer can then make a tipping selection by electing any one of the four tipping options 701. The server can provide the payer the option to change a tipping option selected by the payer. In some cases, the server provides the payer the opportunity to change a selected tipping option within a predetermined time frame, such as within a one hour upon the termination of processing of a transaction with the merchant.

For example, from the GUI of FIG. 7 the payer can select $1 as the tipping option. The server can then process the transaction with Coffee Spot and apply the $1 tip selection to the transaction. If the payer has purchased a $4 cup of coffee from Coffee Spot, the server can provide Coffee Spot $4 (cup of coffee)+$1 (tip)=$5 (total).

The merchant card 700 also includes a first graphical button 702 that enables the payer to close or minimize the merchant card 700, and a second graphical button 703 that enables the payer to share the merchant card 700 with another individual or entity, such as another user (e.g., payer).

In some examples, the payer can change the look of the merchant card 700, such as, for example, by changing the orientation of the tipping options (e.g., rows, columns) and the manner in which tipping options are provided to the payer or a tipping selection is retrieved from the payer. The payer can select a tipping option with the aid of a pointing device, the payer's finger, voice commands, and/or gestures.

FIG. 8 shows a screenshot of a graphical user interface (GUI) 800 that enables a payer to supply a tip to a merchant. The GUI 800 can be presented to the payer during or upon the termination of processing of a transaction with a merchant. The GUI 800 includes a back button 801 that enables the payer to navigate to a previous screen of the GUI 800, such as, for example, to a screen showing a menu of the merchant. The GUI 800 can include a first graphical field 802 with a picture, avatar or other indentifying information of the payer, and a second graphical field 803 with a picture, avatar of other identifying information of the merchant. The GUI 800 includes various tipping options 804 ("No tip," "$1", "$2", "$3"). The GUI 800 indicates in a text field 805 that a tab with the merchant has been opened ("OPENED"). A timestamp 806 shows the time ("10:03 AM") that the tab was opened.

The GUI 800 can include a history field 807 that shows the payer's prior tipping history with the merchant. The tipping history can include the timestamp (e.g., date and time) associated with a given transaction with the payer and the tip selection made during the transaction. In the illustrated example, the history field is unpopulated.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A computer-implemented method comprising:
   receiving, at a server of an online payment platform and from a first software application associated with the online payment platform and executing on a first mobile device of a customer, a request to enter into a transaction with a service provider, the transaction having a corresponding transaction amount, each of the customer and the service provider having an account including corresponding identifying information stored in a database associated with the online payment platform, the online payment platform enabling customers and merchants to engage in transactions without an exchange of financial information between the customers and the merchants;
   receiving, at the server and from a second software application associated with the online payment platform and executing on a second mobile device of the service provider, an electronic request to process a cardless payment for the transaction using payment information of the customer, wherein the electronic request serves as an indication that the transaction between the service provider and the customer is complete, wherein each of the first mobile device and the second mobile device send a respective request to the server to download and install a corresponding one of the first software application and the second software application, and
   the first mobile device and the second mobile device are in geographical proximity of each other at a time of receiving the request from the first mobile device at the server;
   determining, at the server and for the transaction, a tipping process, the tipping process being one of an automatic tipping process for the transaction whereby a first tip amount is automatically determined by the server to be added to the transaction amount, or a manual tipping process whereby a second tip amount to be added to the transaction amount is provided via the first software application;
   after receiving the request to process the cardless payment, applying one of the first tip amount or the second tip amount to the transaction amount based on the determined tipping process;
   delaying, by the server and after the transaction between the service provider and the customer is completed, processing of the cardless payment for the transaction until the first tip amount is applied based on the automatic tipping process, or until one of an expiration of a threshold timing or the second tip amount is received via the first software application based on the manual tipping process;
   initiating, by the server, processing the cardless payment for the transaction based at least on the transaction amount and one of the first tip amount or the second tip amount using the payment information of the customer; and
   communicating, by the server and to each of the first software application and the second software application, an electronic message, confirming the processing of the cardless payment between the customer and the service provider.

2. The computer-implemented method of claim 1, further comprising:
   generating, by the server, a digital receipt for the transaction upon receiving the request to process the cardless payment.

3. The computer-implemented method of claim 1, wherein one or more options for adding the second tip amount are expressed as a percentage of the transaction amount.

4. The computer-implemented method of claim 1, wherein one or more options for adding the second tip amount are expressed as fixed amounts to be added to the transaction amount upon selection.

5. The computer-implemented method of claim 1, wherein one or more options for adding the second tip amount are generated by the server based on a transaction history of the customer.

6. An online payment platform comprising: one or more memories having computer-readable instructions stored therein; and one or more processors configured to execute the computer-readable instructions to:
receive, from a first application executing on a first software application associated with the online payment platform and executing on a first mobile device of a customer, a request to enter into a transaction with a service provider; the transaction having a corresponding transaction amount, each of the customer and the service provider having an account including corresponding identifying information stored in a database associated with the online payment platform, the online payment platform enabling customers and merchants to engage in transactions without an exchange of financial information between the customers and the merchants;
receive, from a second software application associated with the online payment platform and executing on a second mobile device of the service provider, an electronic request to process a cardless payment for the transaction using payment information of the customer, wherein the electronic request serves as an indication that the transaction between the service provider and the customer is complete,
wherein each of the first mobile device and the second mobile device send a respective request to the server to download and install a corresponding one of the first software application and the second software application, and
the first mobile device and the second mobile device are in geographical proximity of each other at a time of receiving the request from the first mobile device at the server;
determine, for the transaction, a tipping process, the tipping process being one of an automatic tipping process for the transaction whereby a first tip amount is automatically determined by the online payment platform to be added to the transaction amount, or a manual tipping process whereby a second tip amount to be added to the transaction amount is provided via the first software application;
after receiving the request to process the cardless payment, apply one of the first tip amount or the second tip amount to the transaction amount based on the determined tipping process;
delay, after the transaction between the service provider and the customer is completed, processing of the cardless payment for the transaction until the first tip amount is applied based on the automatic tipping process, or until one of an expiration of a threshold timing or the second tip amount is received via the first software application based on the manual tipping process;
initiate processing of the cardless payment for the transaction using the payment information of the customer and based at least on the transaction amount and one of the first tip amount or the second tip amount; and
communicate, to each of the first software application and the second software application, an electronic message, confirming the processing of the cardless payment between the customer and the service provider.

7. The online payment platform of claim 6, wherein the one or more processors are configured to execute the computer-readable instructions to:
generate a digital receipt for the transaction upon receiving the request to process the cardless payment.

8. The online payment platform of claim 6, wherein the one or more processors are configured to execute the computer-readable instructions to receive an indication from the first mobile device to delay providing the second tip amount when one or more options for adding the second tip amount is displayed on the first mobile device.

9. The online payment platform of claim 8, wherein the one or more processors are configured to execute the computer-readable instructions to:
perform a first processing of the transaction upon receiving the request to process the cardless payment based on the transaction amount; and
perform a second processing of the transaction after determining the first tip amount or receiving the second tip amount to update a total amount for the transaction to include the transaction amount and one of the first tip amount or the second tip amount.

10. The online payment platform of claim 6, wherein each of one or more options for adding the second tip amount are expressed as a percentage of the transaction amount or as a fixed amount to be added to the transaction amount upon selection.

11. The online payment platform of claim 6, wherein one or more options for adding the second tip amount are generated by the online payment platform based on a transaction history of the customer.

12. The online payment platform of claim 6, wherein the one or more processors are configured to execute the computer-readable instructions to:
generate a notification to be sent to the first mobile device to remind the customer of an amount of time left for providing the second tip amount before the threshold timing expires; and
provide, by the online payment platform and to the first mobile device, the notification.

13. One or more computer-readable media having computer-readable instructions, which when executed by one or more processors, cause the one or more processors to provide an online payment platform configured to,
identify a transaction between a customer and a service provider, the transaction having a corresponding transaction amount, each of the customer and the service provider having an account including corresponding identifying information stored in a database associated with the online payment platform, the customer having a mobile device with a first application associated with the online payment platform executed thereon, the service provider having a merchant device with a second application associated with the online payment platform executed thereon, the online payment platform enabling customers and merchants to engage in transactions without an exchange of financial information between the customers and the merchants;
receive a request to process a cardless payment for the transaction using payment information of the customer, wherein the request serves as an indication that the transaction between the service provider and the customer is complete, wherein each of the first mobile device and the second mobile device send a respective request to the server to download and install a corresponding one of the first software application and the second software application, and the first mobile device and the second mobile device are in geographical proximity of each other at a time of receiving the request from the first mobile device at the server;

determine, for the transaction, a tipping process, the tipping process being one of an automatic tipping process for the transaction whereby a first tip amount is automatically determined by the online payment platform to be added to the transaction amount, or a manual tipping process whereby a second tip amount to be added to the transaction amount is provided via the mobile device of the customer;

after receiving the request to process the cardless payment, apply one of the first tip amount or the second tip amount to the transaction amount based on the determined tipping process;

delay, after the transaction between the service provider and the customer is completed, processing of the cardless payment for the transaction until the first tip amount is applied based on the automatic tipping process, or until one of an expiration of a threshold timing or the second tip amount is received from the mobile device based on the manual tipping process;

initiate processing of the cardless payment using the payment information of the customer and based at least on the transaction amount and one of the first tip amount or the second tip amount; and communicate, to each of the first application and the second application, an electronic message, confirming the processing of the transaction between the customer and the service provider.

14. The one or more computer-readable media of claim 13, wherein the execution of the computer-readable instructions, cause the one or more processors to:
generate a digital receipt for the transaction upon receiving the request to process the cardless payment.

15. The one or more computer-readable media of claim 13, wherein the execution of the computer-readable instructions, cause the one or more processors to receive an indication from the mobile device to delay providing the second tip amount when one or more options for adding the second tip amount is displayed on the mobile device.

16. The one or more computer-readable media of claim 13, wherein the execution of the computer-readable instructions, cause the one or more processors to:
perform a first processing of the transaction upon receiving the request to process the cardless payment based on the transaction amount; and
perform a second processing of the transaction after determining the first tip amount or receiving the second tip amount to update a total amount for the transaction to include the transaction amount and one of the first tip amount or the second tip amount.

* * * * *